United States Patent
Rawal et al.

(10) Patent No.: US 12,335,341 B2
(45) Date of Patent: Jun. 17, 2025

(54) SYSTEMS AND METHODS FOR OPTIMIZING DISTRIBUTED COMPUTING SYSTEMS INCLUDING SERVER ARCHITECTURES AND CLIENT DRIVERS

(71) Applicant: Elasticflash, Inc., Palo Alto, CA (US)

(72) Inventors: Darshan Bharatkumar Rawal, Fremont, CA (US); Pradeep Jnana Madhavarapu, Cupertino, CA (US); Naoki Iwakami, Redwood City, CA (US)

(73) Assignee: Elasticflash, Inc., Palo Alto, CA (US)

( * ) Notice: Subject to any disclaimer, the term of this patent is extended or adjusted under 35 U.S.C. 154(b) by 0 days.

(21) Appl. No.: 18/424,411

(22) Filed: Jan. 26, 2024

(65) Prior Publication Data

US 2024/0283844 A1 Aug. 22, 2024

Related U.S. Application Data

(63) Continuation of application No. 17/816,292, filed on Jul. 29, 2022, now Pat. No. 11,888,938.
(Continued)

(51) Int. Cl.
*H04L 67/1097* (2022.01)
*G06F 15/76* (2006.01)
(Continued)

(52) U.S. Cl.
CPC ........ *H04L 67/1097* (2013.01); *H04L 67/568* (2022.05); *G06F 15/76* (2013.01); *G06T 1/20* (2013.01)

(58) Field of Classification Search
CPC ... H04L 67/1097; H04L 67/568; G06F 15/76; G06T 1/20
See application file for complete search history.

(56) References Cited

U.S. PATENT DOCUMENTS

| | | | |
|---|---|---|---|
| 7,080,371 B1 * | 7/2006 | Arnaiz | G06F 8/65 717/170 |
| 10,540,330 B1 * | 1/2020 | Tiwari | G06F 16/24542 |

(Continued)

FOREIGN PATENT DOCUMENTS

| | | |
|---|---|---|
| CN | 105988970 A | 10/2016 |
| CN | 106557358 A | 4/2017 |

(Continued)

*Primary Examiner* — Shean Tokuta
(74) *Attorney, Agent, or Firm* — KPPB LLP

(57) ABSTRACT

Systems and methods for optimizing distributed computing systems are disclosed, such as for processing raw data from data sources (e.g., structured, semi-structured, key-value paired, etc.) in applications of big data. A process for utilizing multiple processing cores for data processing can include receiving raw input data and a first portion of digested input data from a data source client through an input/output bus at a first processor core, receiving, from the first processor core, the raw input data and first portion of digested input data by a second processor core, digesting the received raw input data by the second processor core to create a second portion of digested input data, receiving the second portion of digested input data by the first processor core, and writing, by the first processor core, the first portion of digested input data and the second portion of digested input data to a storage medium.

20 Claims, 22 Drawing Sheets

Related U.S. Application Data

(60) Provisional application No. 63/227,234, filed on Jul. 29, 2021.

(51) Int. Cl.
  G06T 1/20 (2006.01)
  H04L 67/568 (2022.01)

(56) References Cited

U.S. PATENT DOCUMENTS

| | | | | |
|---|---|---|---|---|
| 11,768,837 | B1* | 9/2023 | Newman | G06N 5/02 |
| | | | | 707/722 |
| 2014/0279876 | A1* | 9/2014 | Prasanna | G06F 16/258 |
| | | | | 707/610 |
| 2015/0220572 | A1* | 8/2015 | Svarovsky | G06F 16/242 |
| | | | | 707/603 |
| 2018/0285389 | A1* | 10/2018 | Maurya | G06F 16/258 |
| 2019/0236200 | A1* | 8/2019 | Lu | G06F 16/178 |
| 2020/0159714 | A1* | 5/2020 | Rawal | G06F 16/27 |
| 2022/0083501 | A1* | 3/2022 | Joffe | G06F 16/116 |
| 2022/0253453 | A1* | 8/2022 | Thomas | G06F 16/25 |
| 2023/0036832 | A1* | 2/2023 | Rawal | H04L 67/566 |
| 2024/0119031 | A1* | 4/2024 | Lahiri | G06F 16/2365 |
| 2024/0283844 | A1* | 8/2024 | Rawal | H04L 67/53 |

FOREIGN PATENT DOCUMENTS

| | | | |
|---|---|---|---|
| CN | 106557358 B | 8/2020 | |
| WO | 2016041447 A1 | 3/2016 | |
| WO | 2019141157 A1 | 7/2019 | |
| WO | 2021240140 A2 | 12/2021 | |
| WO | WO-2024076405 A1 * | 4/2024 | G06F 16/212 |

* cited by examiner

SYSTEMS AND METHODS FOR OPTIMIZING DISTRIBUTED COMPUTING SYSTEMS INCLUDING SERVER ARCHITECTURES AND CLIENT DRIVERS

CROSS-REFERENCE TO RELATED APPLICATIONS

The current application is a continuation of U.S. patent application Ser. No. 17/816,292, filed Jul. 29, 2022, entitled "Systems and Methods for Optimizing Distributed Computing Systems Including Server Architectures and Client Drivers" to Rawal et al., which claims priority to U.S. Provisional Application No. 63/227,234 filed Jul. 29, 2021, entitled "Systems and Methods for Optimizing Distributed Computing Systems Including Server Architectures and Client Drivers", the disclosure of which are incorporated herein by reference in their entirety.

BACKGROUND OF THE INVENTION

Creating a distributed computing system (particularly a data platform) involves a collection of design choices across several system components, typically made for local efficiency of many of those system components. The cumulative effect of such local decisions, and the general-purpose nature of the database, often delivers a subpar experience for the end-users of a specific use case (e.g., analytics).

Analytics is the process of gleaning insights from data. It is usually done by indexing, aggregating and finding patterns within structured, semi-structured, and unstructured data. To do so, data is sent from data source clients to a "data processing engine" (usually a cluster/collection of servers) that performs most of the indexing, aggregation, etc. (as per a specification that is inferred or defined by the user) and makes it available for querying by data practitioners. A cluster typically includes coordination among multiple machines for data redundancy, load balancing, and/or high availability. The entity (e.g., company, user, etc.) that owns a set of data on a data processing engine is often referred to as a tenant. Multiple sources of data (e.g., sensors, IoT devices, etc.) can be associated with a tenant, and each source can provide one or more streams of data containing data elements expressed as a loosely coupled pair of key-value pairs, or other unit of information, which can be contained within a table. Accommodating multiple streams from multiple tenants at a single data processing engine can raise complexity and challenges to guarantee quality of service (QOS).

Additionally, the chain of communication within a computing system or between computing systems is often inefficient. Traditional computing client-server architectures have typically focused on the client connecting to the server (to establish a communication channel), the client sending (pushing) requests to the server, the server processing the requests by sending requests (pushing) to downstream systems (databases, operating systems, caches, etc.) and then returning (pushing) a response to the client. A request from an end user application (e.g. a browser, IoT sensor) involves a complicated message-passing of requests and responses across a variety of components (e.g., Browser, Load Balancer, Web-server, Middleware Server, DB Server, Operating System, Device Drivers and eventually hardware). Each of these components are designed, built and architected by different teams/companies, using different toolchains/languages, a variety of communication mechanisms/protocols and different internal design choices. When all of this is put together the end-to-end path results in a suboptimal service level agreement (SLA) (e.g. latencies, outliers, etc.) which is usually resolved by over-provisioning and/or reactive monitoring on the cloud. Aspects of many existing client-server models include the following.

Communication Channels and Request/Response Handling

Channels can be across a network, within a host (physical, VM or container), or within a process. There are different existing ways of handling requests and responses as outlined below. With a single request and response exchange, the client sends a request to the server and waits for a response; before sending another request. With parallelized multiple requests and responses on a single channel, the client sends multiple requests to the server (unless the server says no/wait) and responses can be handled out of band by the client. Another mechanism can include adding batching semantics. Instead of firing multiple requests/responses one at a time, the client and server participate in batching requests/responses to optimize for network usage, context switching, etc.

Threading

A multi-threaded architecture may utilize one thread per client channel or a thread pool model, where a single thread looks for requests from all client channels and then delegates the requests to a thread pool. In a single-threaded architecture, typically a single thread handles one request at a time or a single thread handles multiple requests via ASYNC (non-blocking) semantics. Thread scheduling may utilize a wait/notify mechanism, where threads are woken up when work is present, or spinning, where threads spin continuously looking for work. There can also be hybrid behavior; whereby threads "spin" polling for work and periodically sleep.

Many of these design choices are not mutually exclusive; for example, a single server can include client facing threads which are 1 thread/client, but then DB threads which are bound to a single communication channel.

The suboptimal combination of design choices on various interoperating platforms results in a nightmare for infrastructure sizing, overload protection, timeout handling (for compute, network and storage). Worse, every stage starts to seemingly help by providing throttling semantics, and every client implements (so-called intelligent) back-offs and retries, without consideration for the entire system call path. The result is massive over-provisioning, without deterministic characteristics, especially under overload.

DETAILED DISCLOSURE OF THE INVENTION

Figure 1:
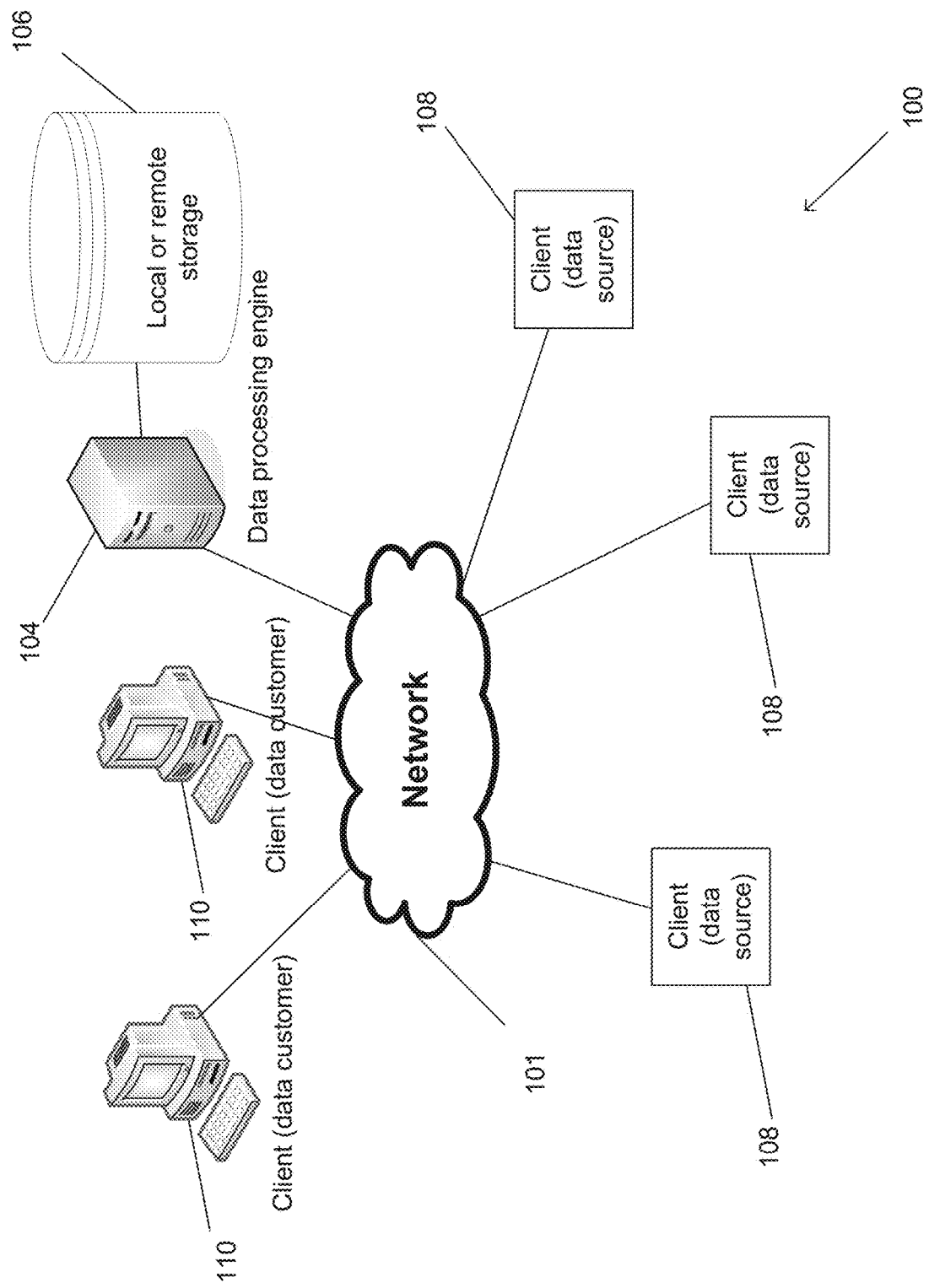
FIG. 1 illustrates a data processing system architecture in accordance with certain embodiments of the invention.

Turning now to the drawings, systems and methods for optimizing distributed computing systems for data processing are disclosed. One or more of the techniques discussed here may be used to optimize a myriad of system characteristics related to reliability, availability, and service level agreement (SLA) determinism, and particularly within cloud environments. Benefits of using these techniques can include:
  end-to-end (E2E) optimization of mean and outlier SLAs
  Most optimal throughput by minimizing memory copies, context switches, etc. (via removal of all/as many horizontal abstractions as feasible)
  Failure handling without a 3rd-party component (e.g., Kafka)
  Co-location of Single Tenant and Multi-tenant Deployments with deterministic SLAs
  Privacy-aware ingestion, indexing, and analytics processing Within a computer architecture there are passive components (e.g., memory, flash chips, L1/L2/L3 caches, communication buses, etc.) and active components (e.g., CPU, GPU, Network Processors, ARM processes on an SSD, etc.). Grouping these components, e.g., CPU cores+L1/L2 cache or ARM Processes+Flash Chips+Communication Channels, results in components which are then interconnected (via communication channels such as NVMe, PCIe, etc.) to form a "motherboard." Irrespective of their assembly, there are two aspects of these components which are common:
  a) Active components that function at a pre-defined speed (e.g., 3 GHZ, or 2.2 Ghz with Turbo mode). For example, a CPU core "pulls" instructions and data to execute from memory over a communication channel such as DDR3. Passive components (e.g. RAM, Flash Chips, etc.) respond to requests from the active components via interrupts, etc.
  b) Active components are heterogeneous in nature to account for the impedances of various passive components and their interconnects. For example, the construction of a graphics processing unit (GPU) is tailored for floating point math, compared to the network processors whose job is to encrypt/decrypt, etc.

A similar architecture is proposed in accordance with embodiments of the invention by two innovations, which may be implemented together or separately:
  a) Each layer in the software-hardware stack "pulls" instructions from the layer above. When there are static hardware components (e.g., flash chips) active components can be included alongside them (e.g., a flash chip may have a small low-power compute element). This is referred to below as the cooperative communication model.
  b) A software execution model of virtual cores and sockets tailored for specific processing tasks. As will be discussed in greater detail below, physical hardware cores can be assigned specific data processing roles and the technical specifications of the cores can be tailored accordingly.

First will be discussed architectures for distributed computing systems for data processing and individual platforms, including virtual sockets with virtual cores that can be dedicated to particular tasks (roles). A server architecture in accordance with embodiments of the invention can be implemented that mimics cores and sockets of a modern microprocessor, by assigning processing tasks to virtual cores (which are closely associated to hardware cores) and grouping the virtual cores as virtual sockets. Then will be discussed a communications paradigm, referred to as "cooperative communications model", for end-to-end communications between entities (e.g., over a network) or within an entity (e.g., between system components) that optimizes for the incoming data rate capacity from the downstream component(s) perspective. Finally, additional design optimizations will be discussed for server side and client side systems, such as for storage and memory management. As will be described in greater detail below, client-side applications developed with SDK (software development kit) components (which can also be referred to as SDK drivers) can be aware of some data processing tasks, (e.g., digestion, aggregation, indexing, etc.) to be performed on collected information that are traditionally done by a server and may perform some of these tasks on the client.

Techniques in accordance with certain embodiments of the invention can distinguish between different types of data as immutable (referred to as signal, where past data remains relevant) and mutable (referred to as context, where only current values are relevant and past data is not) to more judiciously perform compaction. Signal type data streams can be defined as streams with data that is typically high volume and immutable (e.g., data is not modified after creation and/or past data remains relevant/meaningful). For example, IoT (internet of things) sensor data typically saves a history of data points that do not change. Signals data do not need to be stored as separate data files on disk. In contrast, context type data streams are typically low to medium volume and mutable (e.g., only a current value of the data is kept and/or past data is not relevant/meaningful). For example, contact information about a customer (e.g., name and address) does not require past data values to be retained, only the current value matters. As will be discussed further below, signal data can be converted into context data, and updates to context data can be output into a new signal.

Various embodiments of the invention provide advantages to distributed computing implementations of big data, particularly those supporting machine learning. Conventional big data implementations have a general separation of ingestion (onboarding), digestion (processing), and retrieval (consumption) processes. Typically, ingestion is schemaless—e.g., data is dumped into storage such as Amazon S3 and processed at a later time. Systems (e.g., RDMBS, Web Apps, etc.) that are aware of the schema, blobify the payload and store it in schemaless storage such as S3. The advantages of this approach are the transport "pipe" (e.g., CDC (change-data-capture), Kafka, etc.) can be "dumb" (simple), schema changes do not require changes to ingestion pipelines, and efficiency of transport, etc. Once data lands on the storage platform, a schema-on-read principle is applied to process the data. A typical extract-transform-load (ETL) or extract-load-transform (ELT) paradigm involving processing (e.g., digestion) and storing processed data in the same schemaless store is utilized.

Many embodiments of the invention enable advantages of both tight validation of schema-oriented architecture and the efficiency and adaptability of schemaless architecture. One feature in some embodiments includes all client SDKs (client drivers) being made aware of schema changes in a live and dynamic manner. Techniques for propagating schema changes as a state update to distributed computing systems are described in U.S. Pat. Pub. No. 2020/0159714 entitled "Distributed data storage and analytics system" to Rawal et al. (the '714 publication), the relevant portions of which are incorporated by reference in their entirety. When the client sends a request to a data processing engine, the client SDK can parse out schema-oriented aspects (e.g., indexes, digests, etc.) and pack the rest of the payload into a schemaless (BLOB-style) payload. Changes in schema can be propagated to all SDK instances in an atomic manner and in real-time. In many embodiments, schema updates can support adding default values (e.g., for newly added fields, etc.), back-filling of indexes/digests based upon schema changes and thereby removing impedance of managing schema changes, while maintaining efficiency of schemaless systems.

In several embodiments, downstream processing (e.g., digestion) is performed as real-time as possible. High magnitudes of efficiency can be gained removing traditional ETL/ELT architecture of repeating steps of store, read, process, etc. As will be discussed in more detail further below, a cooperative communication model can remove inefficiencies and improve determinism across entities or communicating hardware/software components by regulating transmissions based on upstream capacity and initiative.

Next will be discussed overall system architectures in accordance with embodiments of the invention.

Data Processing System Architecture

A networked computing environment for data processing in accordance with embodiments of the invention is illustrated in FIG. 1. The computing environment 100 includes data processing engine 104, storage 106 (which can be local or remote to the data processing engine 104), and data sources 108, which may communicate over network 101.

The environment 100 may include one or more devices that act as sources of data. Data sources 108 may include, but are not limited to, Internet-of-Things devices or sensors, user devices (e.g., mobile phones, tablets, laptops, wearable devices, personal health devices, fitness trackers, etc.), point of sale devices (e.g., in-store point of sale terminals), servers (e.g., web servers that provide data such as clicks on particular web pages), etc.

Data sources 108 may be configured with a corresponding data collection application. As will be discussed further below with respect to FIG. 2 and processes such as those illustrated in FIGS. 7 and 8, data collection applications may provide functionality for data generated by a data source 108 to be sent to a data processing engine 104, which may include a distributed database. Data collection applications may also provide other functionality. In some embodiments of the invention, a data collection application may include an application component, e.g., a library, provided by a third-party other than the developer of the application. For example, the application component may be provided by a cloud computing vendor that provides data storage and/or analytics services. For example, the application component may be part of or developed using a software development kit (SDK) provided by the third-party that is designed for interacting with data processing engine 104.

In some embodiments of the invention, data sources 108 may be configured with ingest capability. Data source 108 may be configured, for example by a data collection application, to send data to one or more other devices via network 101. For example, such data may include sensor readings, data obtained by a user device such as location information, user activity information (e.g., heart rate, websites visited, etc.), sales data from a PoS (point-of-sale) device (e.g., transaction records, payment method used for a transaction, SKUs of items purchased, etc.), or data from servers (e.g., click data from a web server, logs from a firewall, data from cameras or image sensors including image metadata such as timestamps, location, etc., radar/LIDAR data, etc.).

Environment 100 may further include data customers 110. In some embodiments of the invention, data customers 110 may be configured with a software application that includes one or more components that are provided by a third-party vendor, e.g., as part of an SDK. For example, data customer 110 may include computing devices, e.g., reporting and analytics servers, that analyze data stored with data processing engine 104. Reporting and analytics servers may execute software that analyzes data, including machine-learning algorithms, applications that include business logic to perform one or more actions based on the data, software utilized by data scientists to perform ad-hoc data analyses, etc. In other embodiments of the invention, reporting and analytics capabilities are integrated into the data processing engine, and separate reporting and analytics servers are not needed.

Environment 100 may further include a data processing engine 104, which can each include one or more servers. As illustrated in FIG. 1, a data processing engine 104 may store data in a database (denoted "DB") on storage that is local or remote to data processing engine 104. In embodiments of the invention, storage can be medium such as, but not limited to, memory, flash, 3DXpoint or rotational media that is local or remote connected via an appropriate interconnect.

In some embodiments of the invention, the database may be part of a distributed database, e.g., a database that stores data across a plurality of servers in a distributed manner. In further embodiments, data in the distributed database may be stored in a redundant manner, e.g., a single data value may be stored in two, three, or more servers. Such implementations may be beneficial, e.g., for data resiliency (in the event of failure of one or more servers), for performance (e.g., enabling data values to be read from or written to any of servers), etc. In some implementations, distributed databases, which can be custom built or from commercial providers such as Cloud BigTable or Cloud Spanner from Google Inc., Apache Cassandra, Amazon DynamoDB, etc., may be utilized to implement the database. Remote storage can include cloud solutions such as Amazon S3 or network-attached storage.

In some embodiments of the invention, the one or more servers in a data processing engine may be physical servers (e.g., hardware computing devices) that are configured as distributed database servers, or virtual servers (e.g., virtual machines executing on hardware computing devices). In various implementations, the hardware that is utilized to implement servers may be placed in a single data center (co-located), in multiple data centers (geographically distributed), etc. and may be coupled by a network, e.g., network 120 or other network. Although a specific system architecture is discussed above with respect to FIG. 1, one skilled in the art will recognize that any of a variety of architectures may be utilized in accordance with embodiments of the invention as may be appropriate for a particular application.

Data Source and Data Customer Client Devices

Figure 2:
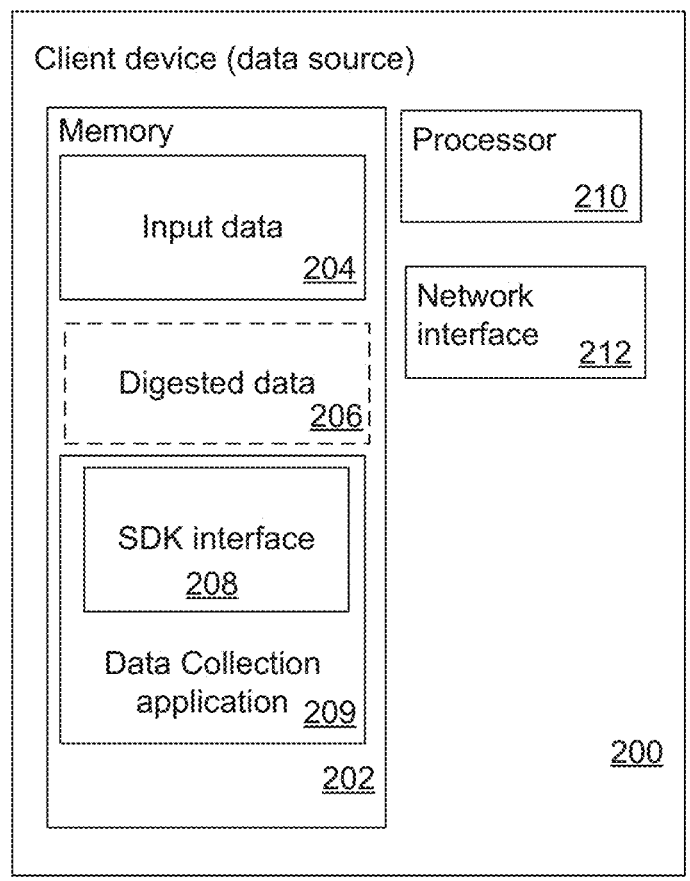
FIG. 2 conceptually illustrates a data source client in accordance with certain embodiments of the invention.

FIG. 2 is a block diagram of data source client device 200 in accordance with several embodiments of the invention. The data source client 200 includes memory 202 that can include input data 204 collected by the data source client 200, digested data 206 that may be produced by the data source client 200 from input data 204, and SDK interface components 208 that may be integrated into a data collection application 209. The data source client 200 further includes a processor 210 that may be configured to execute the data collection application and a network interface 212, which it can use to send and receive information.

Figure 3:
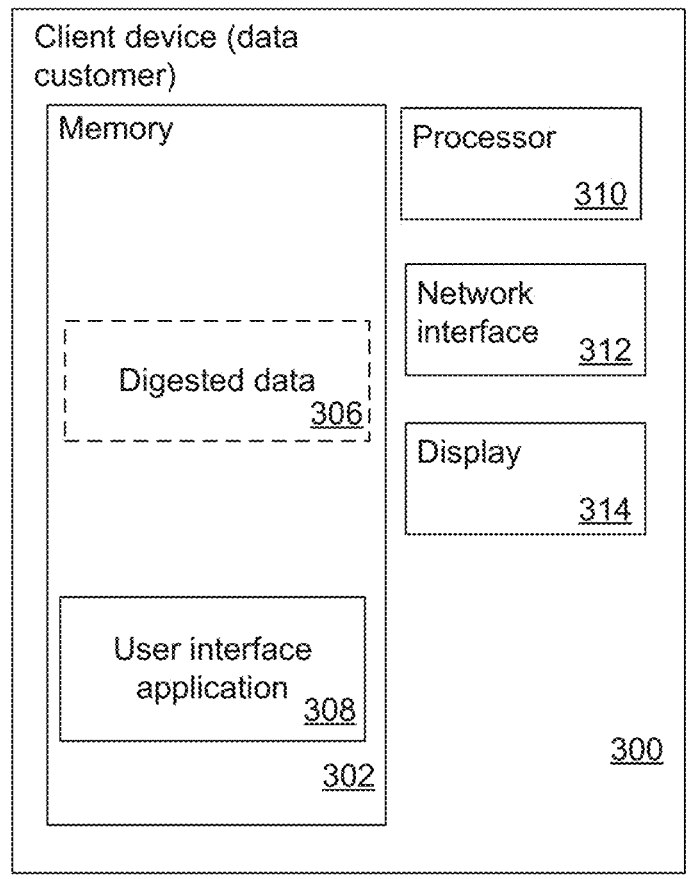
FIG. 3 conceptually illustrates a data customer client in accordance with certain embodiments of the invention.

FIG. 3 is a block diagram of a data customer client device 300 in accordance with several embodiments of the invention. The data customer client 300 includes memory 302 that can include digested data or data products 306 that may be received from a data processing engine, and a user interface application 308. The data customer client 300 further includes a processor 310 that may be configured to execute the user interface application 308, a network interface 312 that it can use to send and receive information, and a display 314 that can show different interface screens based on execution of the user interface application 308.

Although specific architectures are discussed above with respect to FIGS. 3 and 4, one skilled in the art will recognize that any of a variety of architectures may be utilized for a data source client device in accordance with embodiments of the invention. Next will be discussed architectures for servers in a data processing engine in accordance with embodiments of the invention.

Server Architecture

Figure 4:
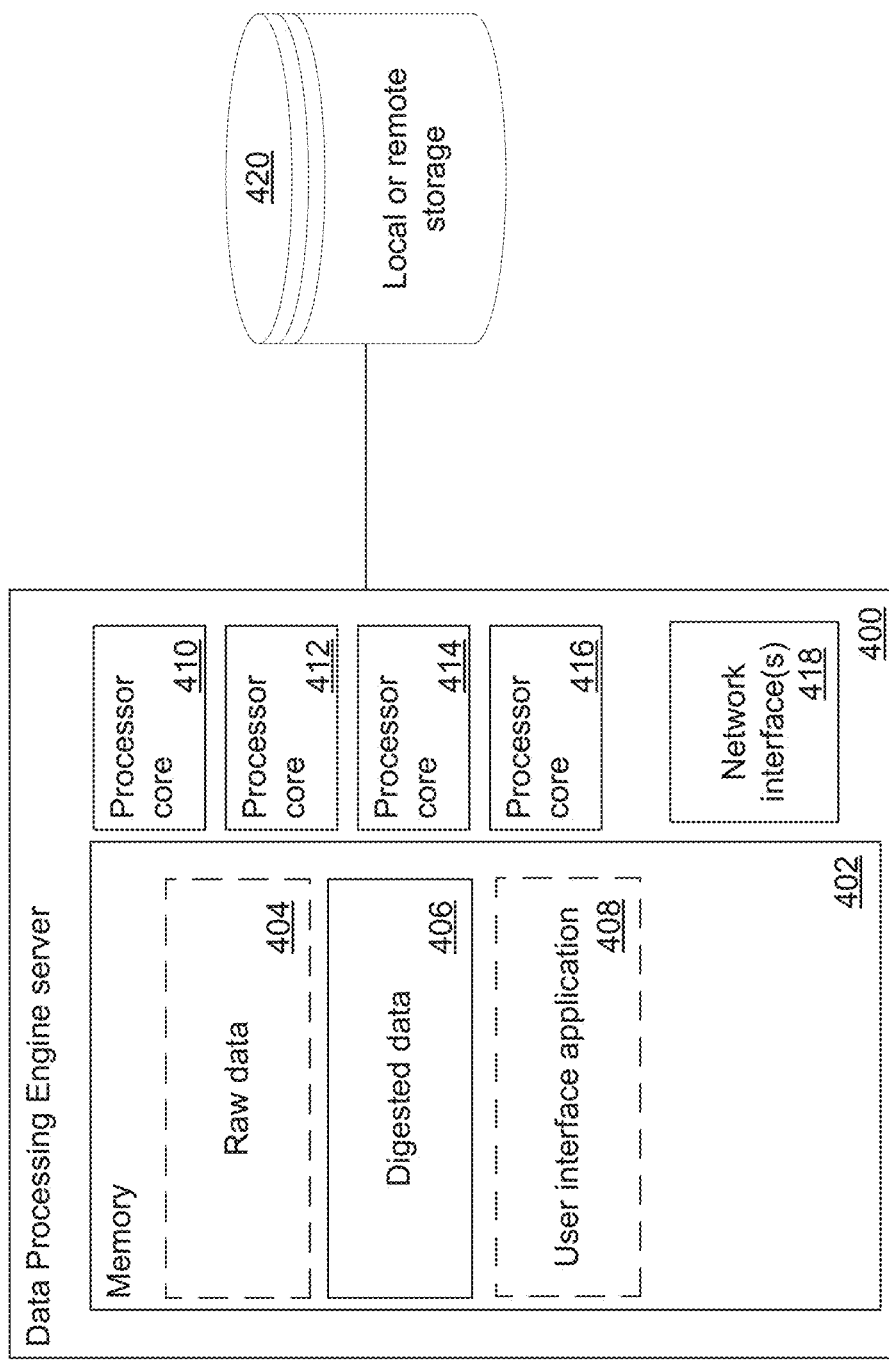
FIG. 4 conceptually illustrates a data processing engine server in accordance with certain embodiments of the invention.

A data processing engine server in accordance with certain embodiments of the invention is illustrated in FIG. 4. The data processing engine server 400 includes memory 402 that can include raw data 404 received from data sources, digested data 406 (produced by the server and/or received from data sources), and a user interface application 408 that can be executed to provide a graphical user interface. The data processing engine server 400 also includes one or more sets of four processor cores 410, 412, 414, and 416. As will be discussed below, processor cores can be assigned different areas of responsibility and to execute functionalities including specific tasks to coordinate the processing of raw and/or digested data on the server. The data processing engine server 400 also includes a one or more network interface(s) 418 from which it may send and receive raw and/or digested data or other information to/from data sources or other devices. Network interfaces can include wired (e.g., Ethernet) and/or wireless (e.g., WiFi) interfaces. Data processing engine server 400 can communicate to read or write data to storage 420, which may be local non-volatile memory on the server or remote storage (e.g., communicated over a network). Remote storage can include cloud services such as Amazon S3 or systems of distributed databases.

Pertinent to the discussions below will be the concept of virtual cores and virtual sockets. A virtual core represents the assignment of a data processing role to a one or more physical processor cores 410, 412, 414, or 416. A data processing role is a specific role within the data processing engine and includes a group of processing tasks supporting a particular aspect of data processing that a server performs. A virtual socket represents a self-contained, self-sufficient group of virtual cores that can act as a unit, where each virtual core performs a different data processing role. A data processing engine server may include one or more virtual sockets, and therefore one or more sets of virtual cores assigned as physical processor cores. In several embodiments of the invention, a virtual socket may include up to four virtual cores.

Implementations of virtual cores and virtual sockets in many embodiments of the invention can be thought of as configuring general purpose multi-core processors (e.g., central processing units or CPUs) as data processing units through software control. A data processing unit (DPU) is a programmable specialized electronic circuit with hardware acceleration of data processing for data-centric computing, similar to how graphics processing unit (GPU) accelerates processing in graphics applications. Moreover, multiple physical cores can be treated as one virtual core with a role assignment as described below.

Figure 5A:
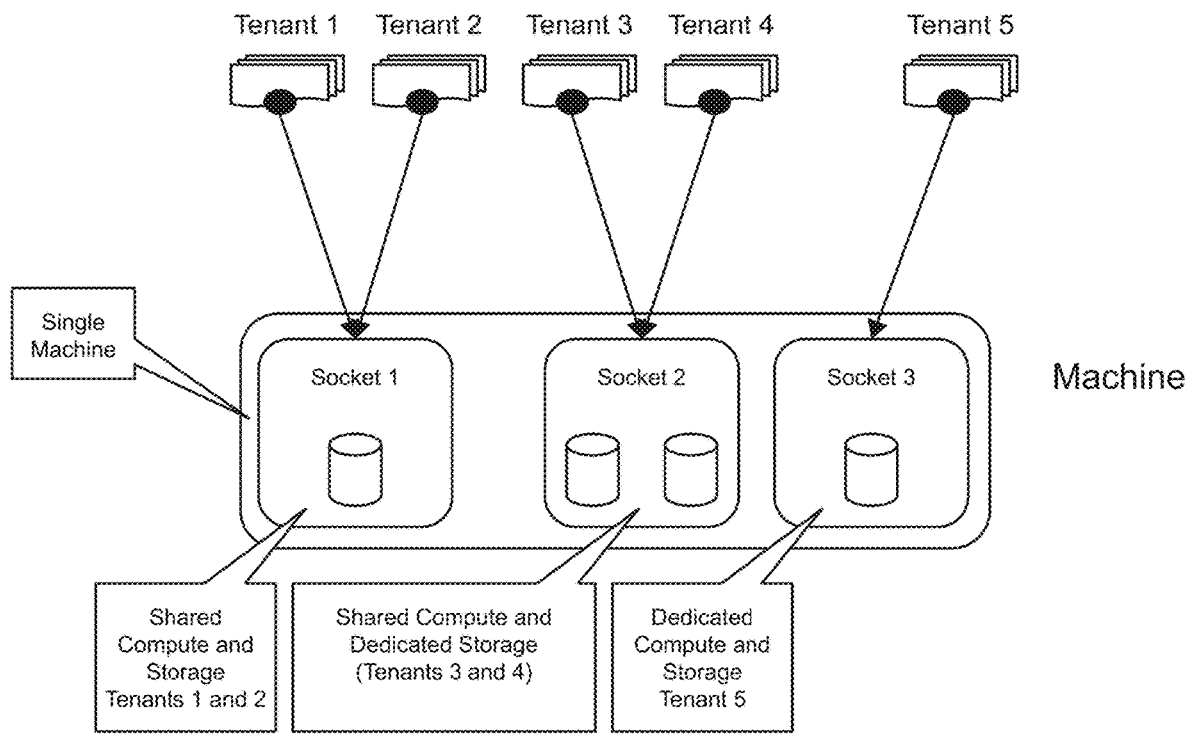
FIG. 5A conceptually illustrates configurations of virtual sockets having virtual cores dedicated to data processing tasks in accordance with several embodiments of the invention.

"Tenant" can refer to an entity (e.g., company, user, etc.) that owns a set of data on a data processing engine. Multiple sources of data can be associated with a tenant, where each source can provide one or more streams of data containing data elements expressed as a loosely coupled pair of key-value pairs, or other unit of information, such as a within table. As conceptually illustrated in FIG. 5A, embodiments of the invention can provide different ways of assigning tenants and streams to resources (e.g., sockets and storage). For example, multiple tenants and their associated streams can be assigned to one virtual socket. Another virtual socket on the same data processing engine server may host only a single tenant and its associated streams. This can balance the sharing of resources with quality of service (QOS). A more dedicated resource (e.g., reserving a virtual socket for a single tenant) can provide stricter or a higher level of QoS than sharing a resource (e.g., hosting multiple tenants on a virtual socket).

Figure 5B:
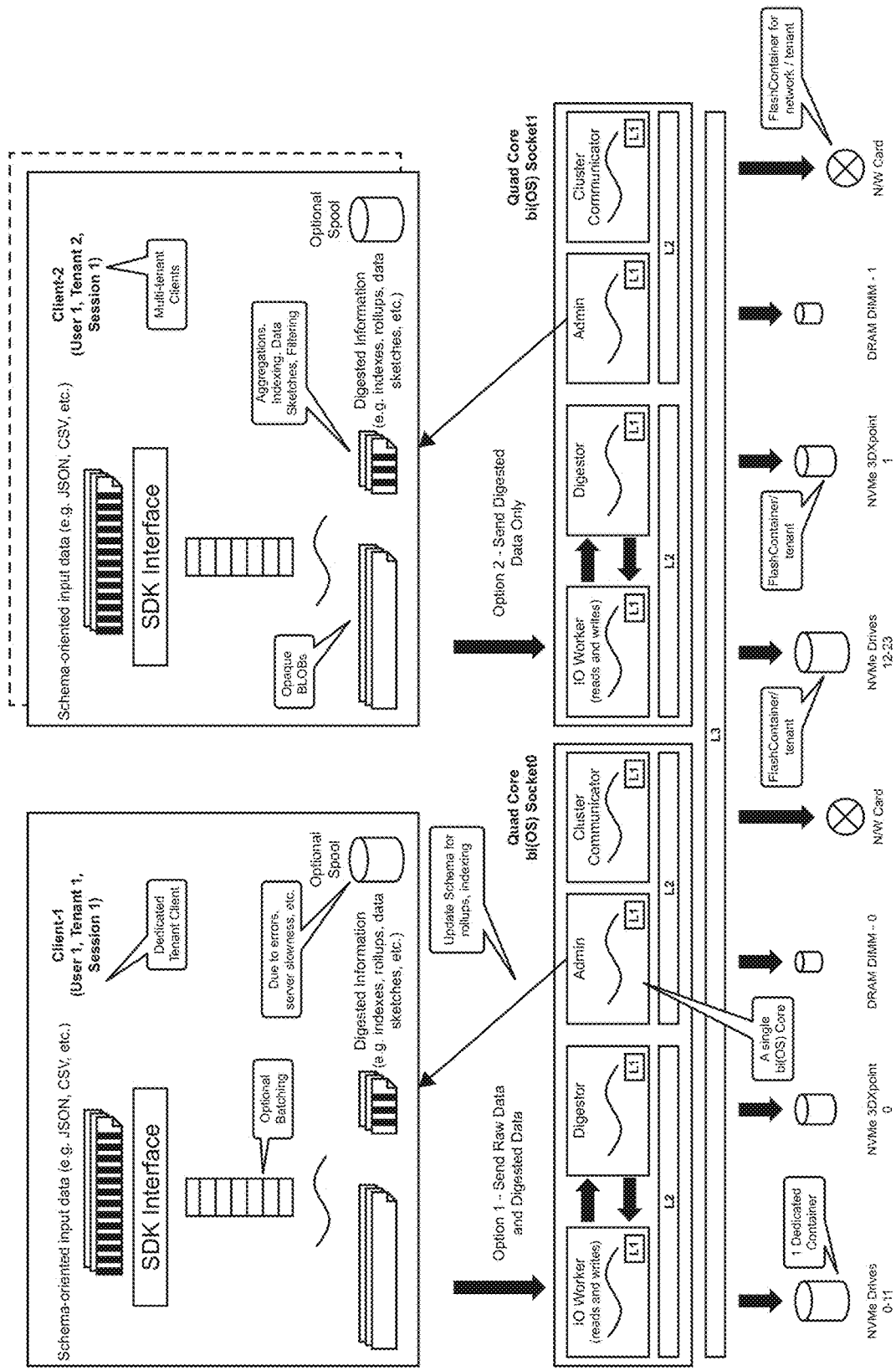
FIG. 5B illustrates different compute and storage configurations for tenants in accordance with several embodiments of the invention.

With reference to FIG. 5B as an example, data processing roles that can be assigned to virtual cores in accordance with embodiments of the invention can include:

IO Worker—In several embodiments, a core assigned as IO Worker can receive data from data sources (such as data sources 108 in FIG. 1), requests from external clients (such as data customers 110 in FIG. 1), other network devices, and/or other cores within the virtual socket (e.g., Digestor) or other virtual sockets, and can perform I/O (input/output) operations (e.g., read, write) to storage. Storage may be local to the server or remote (e.g., network mounted drive or cloud storage service such as Amazon S3). For remote storage, I/O operations can be communications containing read or write instructions and information to be written.

In many embodiments of the invention, an IO Worker core has exclusive control over input/output operations (e.g., over I/O bus) for a virtual socket and is the only core within the virtual socket that may direct input/output operations (e.g., interact with I/O bus). In this way, contention for I/O among different cores can be avoided.

Digestor—In several embodiments, a core assigned as Digestor can receive data from an IO Worker that was sent from a data collection client. Digestion can be understood as processing raw data (e.g., structured, semi-structured, or key-value paired data) in preparation for storage and further usage. In some embodiments, the Digestor is multi-stage (at least two stages)—where earlier stages (e.g., a first stage) can perform tasks associated with the "map" operations in a MapReduce framework and later stages (e.g., a second stage) can perform tasks associated with 'reduce" operations. In certain embodiments, a Digestor can receive pre-digested information (e.g., pre-digested on the client side, for example by a client-side driver) and use it to optimize "map" and "reduce" tasks such as post-processing ingestion tasks (e.g., indexing, rollups, data sketches, etc.). In other embodiments, the Digestor can receive raw or both raw and pre-digested information, in which case the raw information should go through all stages.

In some embodiments of the invention, a Digestor sends the processed information to the IO Worker to write to storage. In other embodiments, a Digestor can store digested information in a particular storage container directly, e.g., DRAM or 3dXpoint. Considerations for whether sending I/O operations to an IO Worker can include anticipating that Digestor tasks are processing intensive, occupying the core, while IO Worker tasks are I/O intensive.

Cluster Communicator—In several embodiments, a core assigned as Cluster Communicator can receive commands from other cores to replicate copies of information to another cluster, perform state exchange between virtual sockets using any of a variety of protocols (e.g., gossip communication protocols, raft algorithms) to arrive at a global state of the cluster, etc. As will be discussed further below, a client-side SDK may be aware of cluster topology in certain embodiments of the invention, in which case a cluster communicator may not be necessary.

Admin Worker—In several embodiments, a core assigned as Admin Worker is responsible for receiving and processing control plane commands from the client-side SDK or other cores (e.g., to change schema, etc.). In some embodiments, to perform any I/O from the data processing engine server it may communicate with the IO Worker core. In other embodiments, the Admin Worker core may use mechanisms with reduced latency (e.g., DRAM or 3dXpoint) rather than communicating with the IO Worker core, which can enable it to keep its own state.

As shown in FIG. 5B, in certain embodiments resources available to a core, socket, and/or motherboard can be assigned and used exclusive or shared as may be appropriate for a hardware configuration. for example, L1 cache can be used per core, L2 cache can be shared per two cores, and/or L3 cache can be shared across multiple sockets.

In some embodiments the physical cores assigned as virtual cores within a virtual socket are homogenous hardware cores—that is cores with identical technical characteristics. In other embodiments, the physical cores in a virtual socket are heterogenous—having different technical characteristics that may be suited to the data processing role assigned to each core. For example, an IO Worker core can be working with HyperThreading OFF at a 2 GHz clock frequency, while a Digestor core can be working with caching and HyperThreading ON with 3.2 GHz frequency. An Admin Worker core may have hibernation enabled. This recognizes that roles can have different load patterns and therefore different clock rates are appropriate. This can include benefits such as:

a) The IO worker core may not need as much execution speed or the need for L1/L2/L3 caching.

b) The Digestor core may need to always be working in Turbo mode and may consume most of the L1/L2/L3 cache.

c) The Cluster Communicator is mostly interrupt driven and may perform network IO transfers in BULK.

d) The Admin worker core is mostly on hibernation which can be awakened based upon interrupt (from a client or other Virtual Socket in the Cluster).

Discussed next below are processes for coordinating data processing among server cores.

Processes for Coordinating Data Processing Among Server Cores

Figure 6:
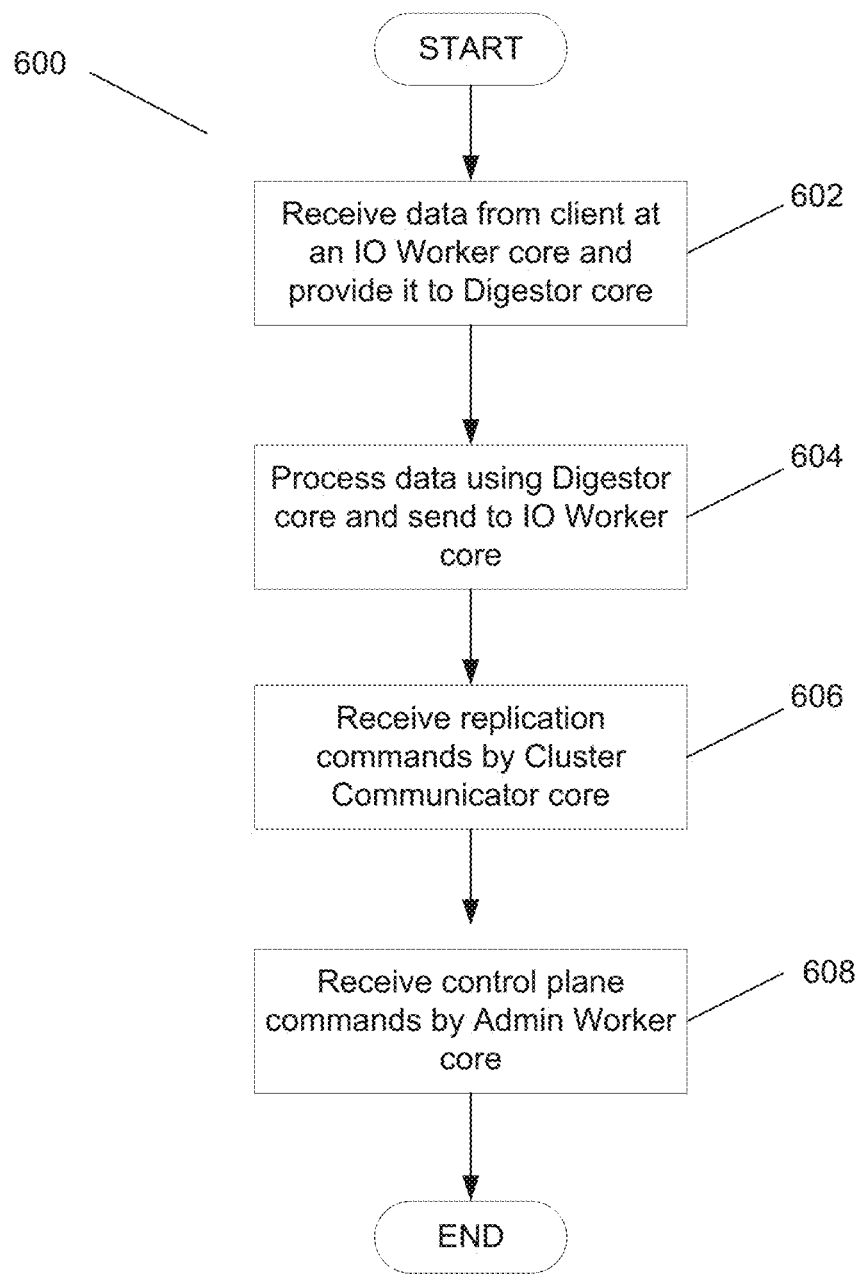
FIG. 6 illustrates a process for coordinating processing tasks among cores in a data processing engine server in accordance with certain embodiments of the invention.

As discussed further above, responsibilities and/or tasks may be separated and assigned among virtual cores in a data processing engine server in accordance with embodiments of the invention. One such process for coordinating data processing tasks in accordance with embodiments of the invention is illustrated in FIG. 6.

The process 600 includes receiving data (602) from a data source client at an IO Worker core on the server and providing the data to a Digestor core on the server. As will be discussed below with respect to the cooperative communication model, in some embodiments, requests may be queued by a data source client and the requests can be provided to the IO Worker upon its initiative and capacity. In a configuration where compute (processing) and storage are dedicated to a particular tenant, the IO worker will only receive requests from client instances of the tenant that it is supporting. Information concerning the configuration (assignment of which socket is serving which tenant) can be stored on the client (SDK), socket, or other centralized configuration management server from which it can be discovered.

The Digestor core processes (604) the data, both raw and partially digested data if included, and sends the processed data to the IO Worker core. The IO Worker core writes the processed data to storage. It may also queue requests to the Cluster Communicator core. In a configuration where compute is shared between tenants and storage is dedicated per tenant, the IO Worker core may write the data to the specific tenant's storage area.

Replication commands can be received (606) by a Cluster Communicator core on the server from other cores and/or sockets. Control plane commands can be received (608) by an Admin Worker core on the server.

Although a specific process is discussed above with respect to FIG. 6, one skilled in the art will recognize that any of a variety of processes may be utilized in accordance with embodiments of the invention.

Cooperative Communication Model

Cooperative Communication Model

As discussed further above in the background, there are some existing approaches to handling requests/responses in a communication channel and thread utilization and scheduling. However, there are advantages and disadvantages to each. Moreover, many real life implementations do not operate efficiently because of information imbalances, for example, not knowing when the receiving entity is available or has capacity to receive.

In many embodiments of the invention, a particular piece of hardware "pulls" requests from the stage above (upstream), with this paradigm extended to each intermediary piece of hardware or software component until it reaches the end client. Here, hardware can refer to any of a variety of types of computing hardware such as, but not limited to, firmware, flash chips, network cards, CPUs, DRAM controller, etc. Client can refer to any of a variety of types of end client devices and/or sources of data such as, but not limited to Internet of Things (IoT) device, web browser, etc. In some embodiments, the upstream hardware or software component can also be required to register with the downstream (i.e., the pulling) hardware or software component before they can communicate. In this way, the downstream hardware or software component can regulate the communications/interactions with the upstream hardware or software component by accepting or denying registration and/or by deciding when to make pull requests. As will be discussed further below, the regulation can be based upon a determination of capacity of the downstream hardware or software component (e.g., hardware resources, etc.).

As a metaphor, imagine a rush hour traffic scenario. Cars drive from individual driveways to freeway entries, where metering lights stop them and one car goes at a time. Further, preferential treatment is given to vehicles carrying multiple individuals (e.g., carpool lanes—think of batching in systems). All of this is done because the inflow of traffic ebbs and flows within the days' time and micro/macroeconomic fluctuations, while the infrastructure (e.g. the freeway) remains constant. Instead, envision a scenario where the freeway (which is the ultimate source of truth of capacity like hardware in computer systems) pulls cars from metering lights at a frequency that ensures no overload and a constant service level agreement (SLA); the metering lights talk to cars in driveways to draw them to metering lights (or not, e.g., the metering light could indicate the individual should work from home instead). And for the drivers on the highway, there is the predictability of reaching their destination no matter the time of the day. This can drastically reduce the contributing factors to rush hour conditions (log jam, accidents, etc.). The analogy carries over to hardware and software communications in accordance with embodiments of the invention. Any hardware component has a clock frequency (e.g., 3.3 Ghz with Turbo mode). With a cooperative communication model as described here, and also in combination with virtual cores as discussed above, the communication between components can be regulated to similarly be "clocked" together for predictability and avoiding overload.

Figure 7:
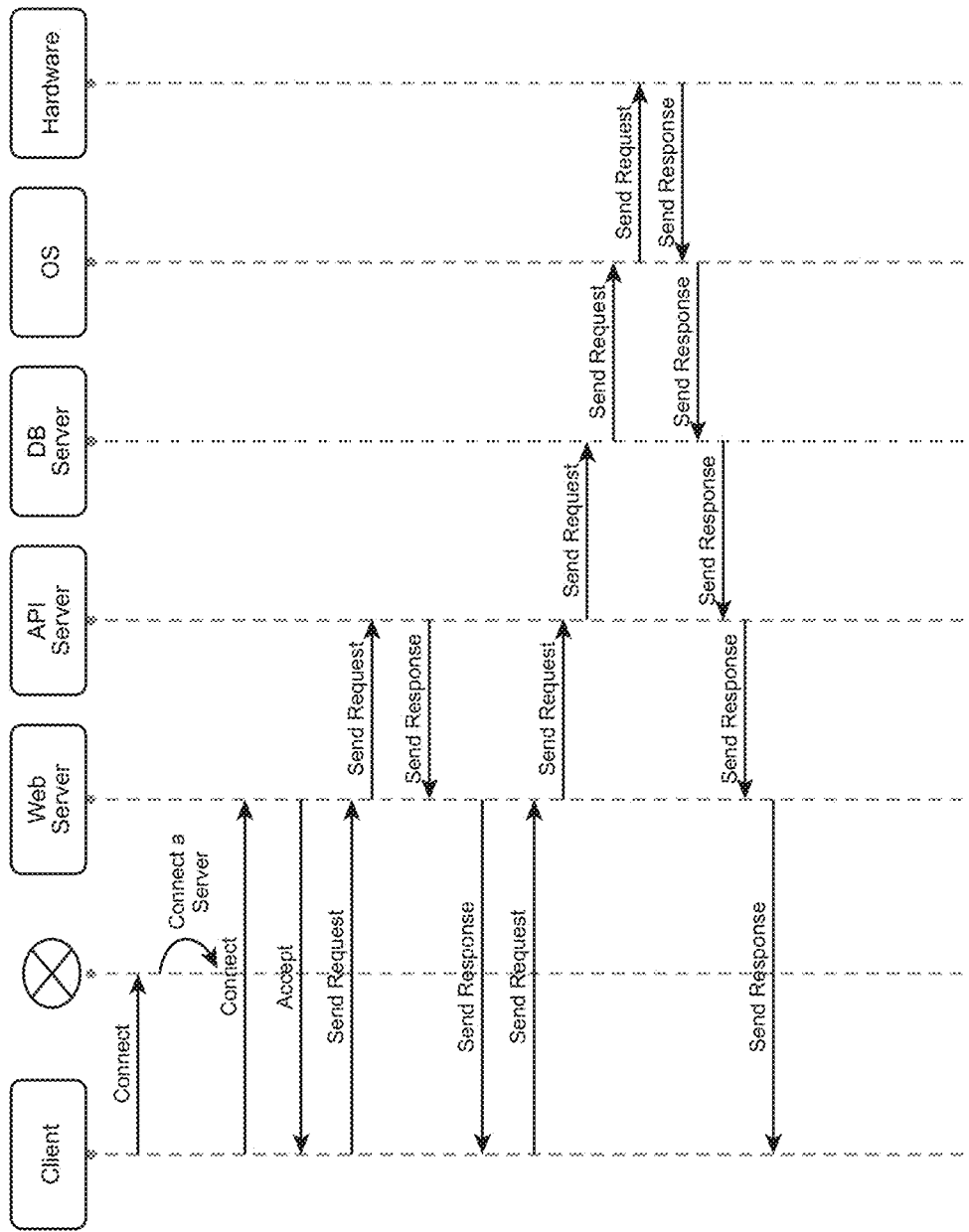
FIG. 7 conceptually illustrates a conventional client/server request/response mechanism in existing systems.

FIG. 7 illustrates a typical client/server request/response mechanism in existing systems. It is clear from the diagram that each layer assumes that the layer below it is dormant (even though it could be actively spinning looking to process requests) and hence pushes requests to it to get some job done. This is what creates overload scenario handling, retries handling, etc.

In contrast, FIG. 8A-13 illustrates a "cooperative communication" mechanism in accordance with embodiments of the invention as will be described in greater detail further below. During an initialization phase such as one shown in FIGS. 8A and 8B, each component in the system registers with a component that is its downstream dependency. This registration can be accepted or rejected by that underlying component based upon the capacity that it can support. Since hardware resources (e.g., CPU, memory, storage, network, etc.) are finite within an infrastructure unit (e.g., a physical server), it is natural for them to know their capacity, which can then be up-leveled to each layer above. Once the registration succeeds, the downstream system can periodically poll the upstream system for requests.

Figure 9A:
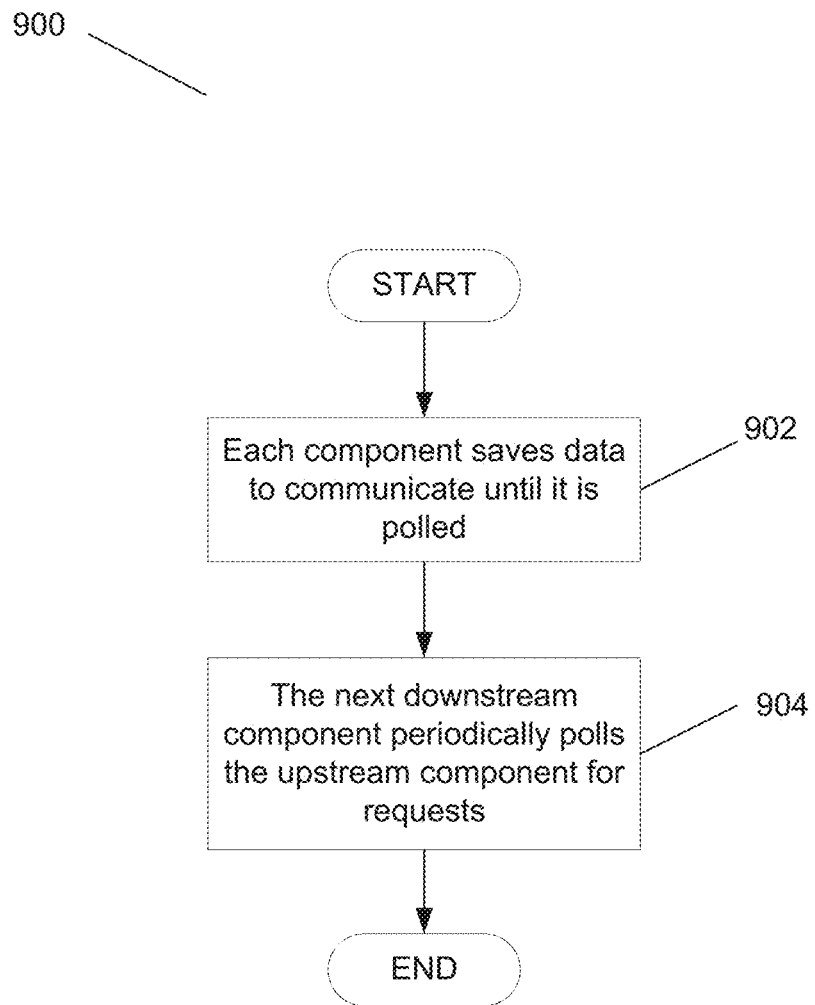
FIGS. 9A and 9B conceptually illustrate a request and response process via pull mechanism in accordance with certain embodiments of the invention.
Figure 9B:
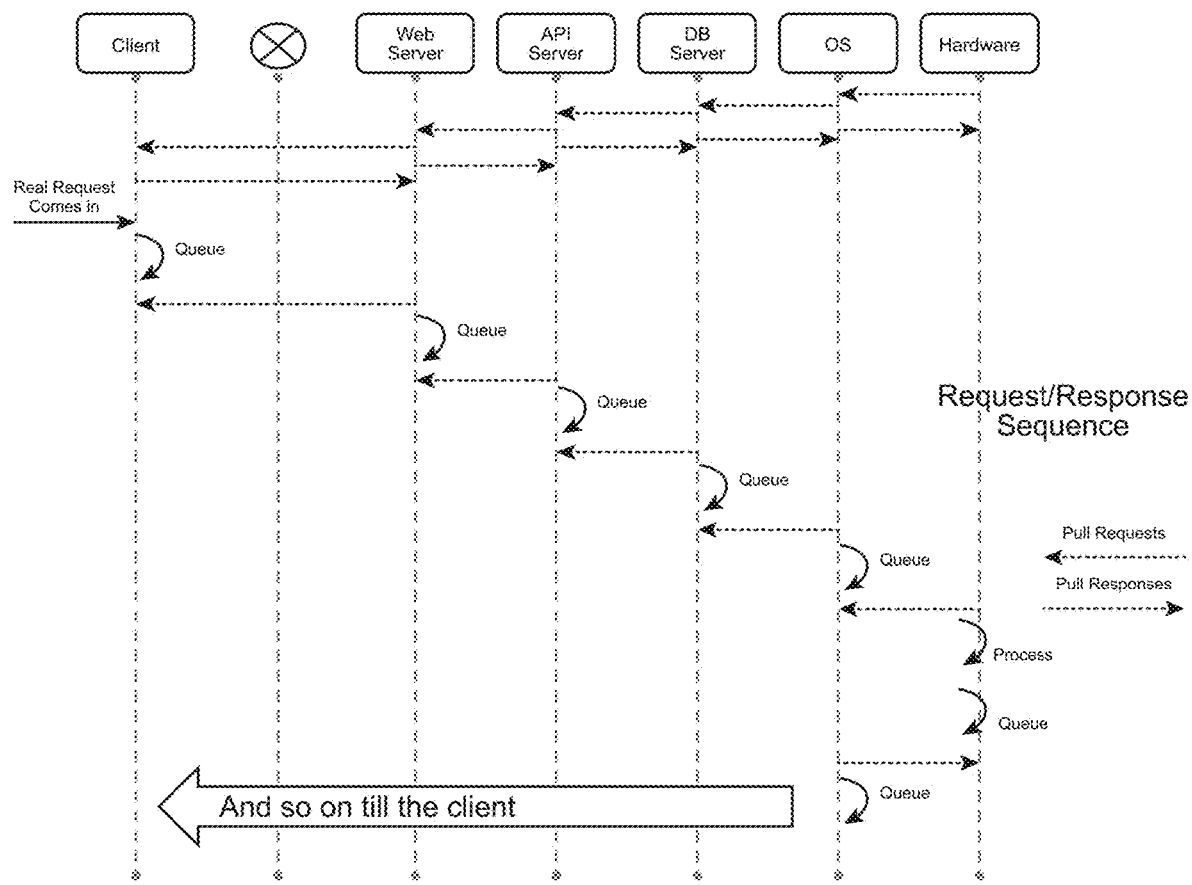

FIGS. 9A and 9B illustrate how requests and responses can be performed after a successful initialization is completed in accordance with some embodiments of the invention. Each component continuously (e.g., at a regular frequency) polls the upstream system for requests that are queued at the upsteam system. Additional details and examples of more specific systems will be discussed further below. Benefits of a "cooperative communication" scheme as described here can include at least the following benefits:

Since the hardware is the last truth of capacity, it knows the rate at which it can pull requests and process them within a specified SLA (service level agreement). Given this architecture, it is possible to run a system under high load continuously and scale-out when the load reaches a particular threshold, while also scaling down when the load reduces. The minimum unit of infrastructure that would run continuously hot will be a single instance (e.g., a server, VM instances, etc.). Given the model works for a single infrastructure unit (e.g., a server), it can deliver web-scale benefits without the distributed smarts. Given that downstream systems poll upstream systems, this architecture optimizes outlier reduction, especially under load, and helps the entire infrastructure stack (network switches, routers, storage arrays, etc.), providing determinism. Clients do not need to retry (or back-off); if the server has picked up the request, it will be served. Moreover, each operation can batch multiple requests/responses and optimize end-to-end predictability and resource usage. Except for the registration phase, no client can mount an attack (e.g., DDOS) on the server as the protocol prohibits clients from initiating requests.

Processes for Initializing Cooperative Communication Model

Figure 8A:
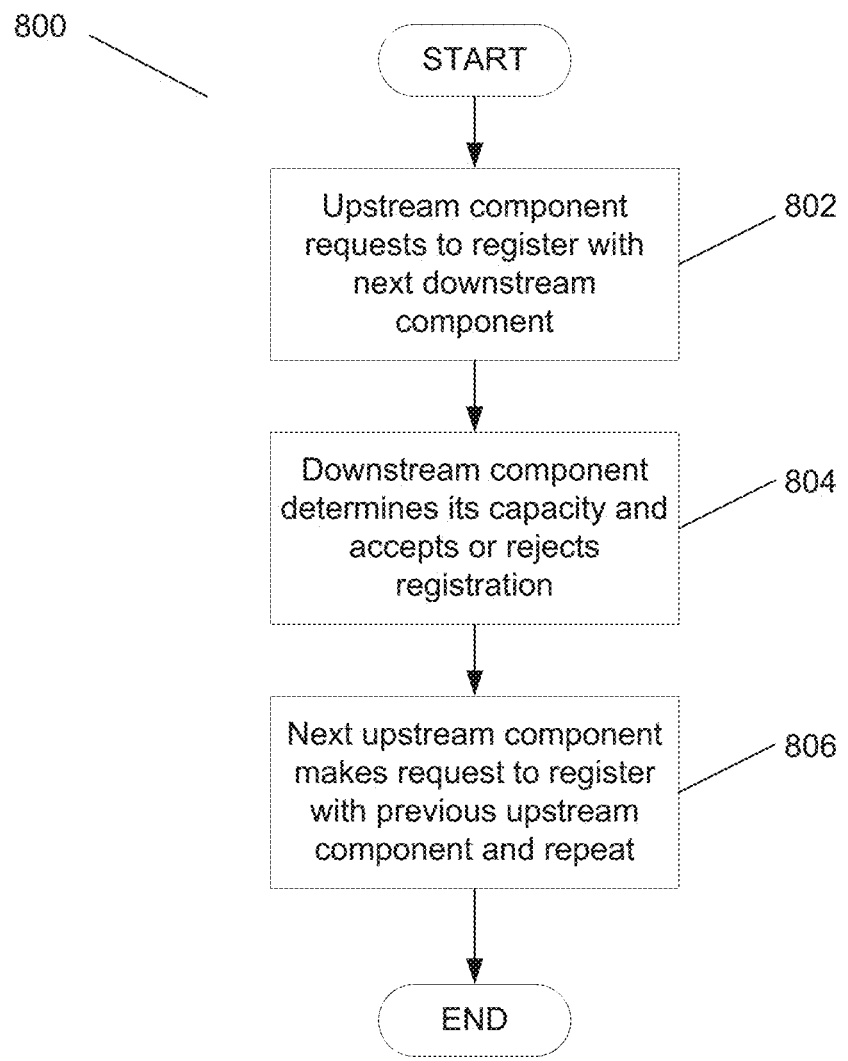
FIGS. 8A and 8B conceptually illustrate a component registration or initialization process for a pull mechanism in accordance with certain embodiments of the invention.
Figure 8B:
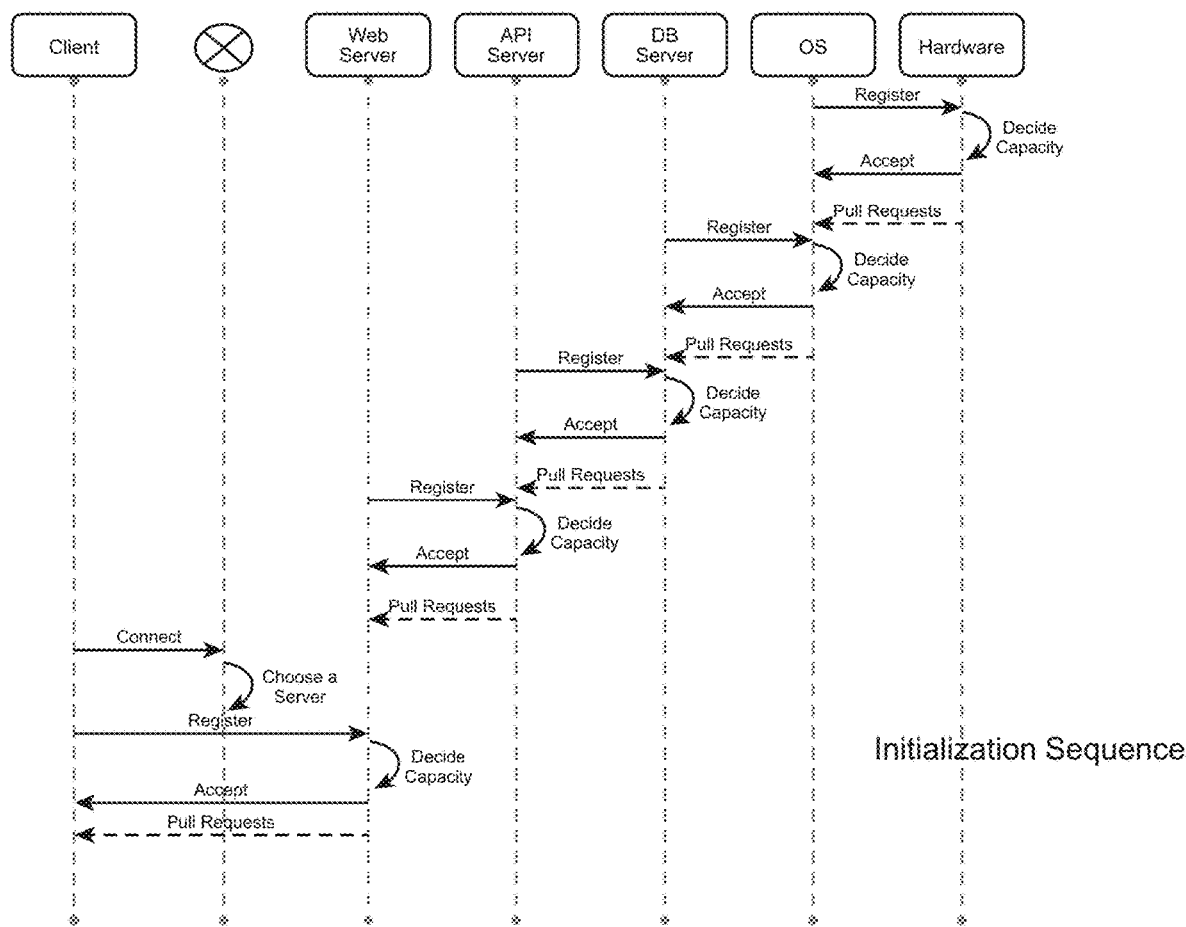

FIGS. 8A and 8B illustrate processes for initializing components to communication using a pull mechanism in accordance with embodiments of the invention. The process 800 in FIG. 8A includes an upstream component sending (802) a request to register with the next downstream component. The downstream component determines (804) its capacity, such as via methods discussed further below, and accepts or rejects the registration. If the registration is accepted, the downstream component can proceed to poll (806) for communications (e.g., requests) from the upstream component via pull mechanism. The process repeats with the next upstream component a level higher than the previous upstream component then requesting registration from the previous upstream component. The process repeats until it reaches the last component (e.g., an end client). FIG. 8B shows an example of a client registering to a web service that includes a database server.

Processes for Requests and Responses

FIG. 9A illustrates a process for sending requests and responses between components using a pull mechanism in accordance with embodiments of the invention. The process 900 in FIG. 9A includes each component saving (902) data that it has to communicate until it is polled. The next downstream component periodically polls (904) the upstream component for its requests. This can be repeated for each component from end to end. FIG. 9B shows an example of a client, having previously registered with a web service, making a request that is first queued at the client, and retrieved by each upstream system in turn by pulling the requests.

Determining Capacity

As discussed above, a downstream piece of hardware may make determinations of its capacity before accepting registration connections from and/or making pull requests to upstream pieces of hardware in accordance with embodiments of the invention. At each stage, there may be active and passive components that can decide capacity, e.g., an ARM processor can be considered an active component in a solid-state drive (SSD) and the flash chip(s) a passive component. The ARM processor can be responsible for determining the capacity of the SSD as a whole. In some cases, the flash chip itself may have compute capability, in which case the decision about capacity can be performed by the flash chip (then it can be considered an active component).

Two approaches to determining capacity can include discovery and dynamic methods, which can be used individually or together. Discovery-based methods can include those based on a specific set of static characteristics of the hardware. Dynamic methods can include those that calibrate the already known current capacity of the hardware based upon any of a variety of parameters. Next will be discussed discovery-based and dynamic methods for determining capacity of some specific types of hardware in accordance with embodiments of the invention.

Several discovery-based methods may be utilized for a solid state drive (SSD). For example, the firmware on an SSD may be capable of supporting a certain number of IOPS, e.g., X 4K read IOPS and Y 4K write IOPS. It can set a margin (e.g. 80% of max) and advertise it to upstream components. It can further calibrate these numbers by probing its internal architecture, e.g., how many channels it has, its frequency, and how many chips it has. It can also calibrate the numbers by performing instrumentation on the channels and/or chips, e.g., running a priming load and determining the measurements dynamically. Other dynamic methods can include measuring throughput metrics under load, removing some clients from their reservation to protect SLA guarantees for other clients (e.g., on a first-in-first-out basis), or having clients retry and get other resources assigned.

Discovery-based methods may be utilized for operating systems as well. For example, an operating system (OS) may discover the hardware configuration of its platform (e.g., 24 NVMe slots, each supporting 6 Gbps, of which ten slots are populated). It can register with the hardware components and request a combined capacity. Then it can advertise the combined capacity to anything that tries to register with itself (e.g., a DB/JVM process).

Discovery-based methods may be utilized on a database server (e.g., Cassandra). Based on a variety of configuration parameters, the C* process can know that it will need X IOPS of sequential write to storage, Y IOPS of network bandwidth, etc. It can then ask the operating system for that capacity with detailed specifications (e.g., 4K sequential write IOPS and 16K random read IOPS).

Example Applications of Cooperative Communication

Discussed below will be several implementations of a pull mechanism as described above with specific types of hardware in accordance with embodiments of the invention. The scenarios mentioned here are meant to be inclusive and not exclusive of how aspects in accordance with embodiments of the invention may be practiced.

Flash Storage

Figure 10:
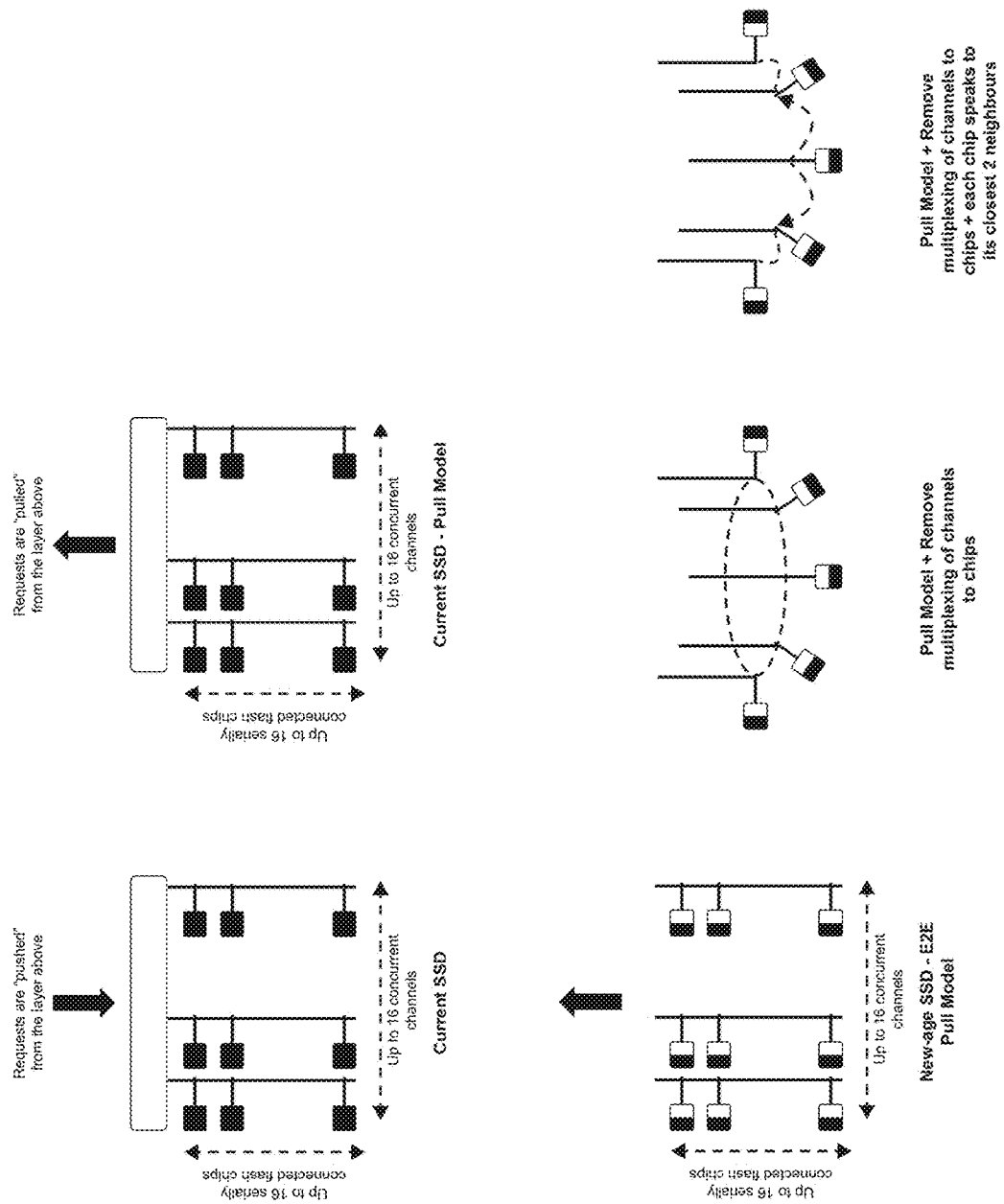
FIG. 10 illustrates architectures and communication models for flash memory within solid state drives (SSD) in accordance with embodiments of the invention.

In some embodiments of the invention, the above concepts can be implemented in software and does not require changes to existing hardware, although it does open up possibilities for enhancements in hardware. Many other embodiments can include either or both software and/or hardware aspects. For example, in current system architectures, passive hardware elements (e.g. flash chips), are typically connected serially to a SSD channel, a number of which are then controlled by an active component such as an ARM processor running a FTL (flash translation layer). Examples of these architectures are illustrated in FIG. 10. In certain embodiments of the invention utilizing the cooperative communication model, an SSD containing flash chips utilizes an FTL that pulls requests instead of receiving pushed requests. In other embodiments of the invention, an end-to-end (E2E) pull model SSD can be implemented where each passive component (e.g., an individual flash chip) can be infused with "active management" (usually in the form of a ultra-low power CPU) that pulls for requests, like other active components.

Furthermore, by adding active components that "pull" to each flash chip, instead of being serially connected with channels and then being connected to an active component such as an ARM processor, the flash chips could form a mesh (or a ring, which is an optimized form of mesh) and interact in a peer-to-peer manner (e.g., to replicate, etc.) while having parallel channels to external components. This would free up the SSD to infinite scale, like scale-out databases of the last decade have done to master-slave architectures of the past three decades. As hardware degrades (e.g., flash), it can adapt the pull frequency dynamically. Note that this principle can be applied to most other passive components (e.g. network cards, memory chips. etc.).

Web Server

Figure 11A:
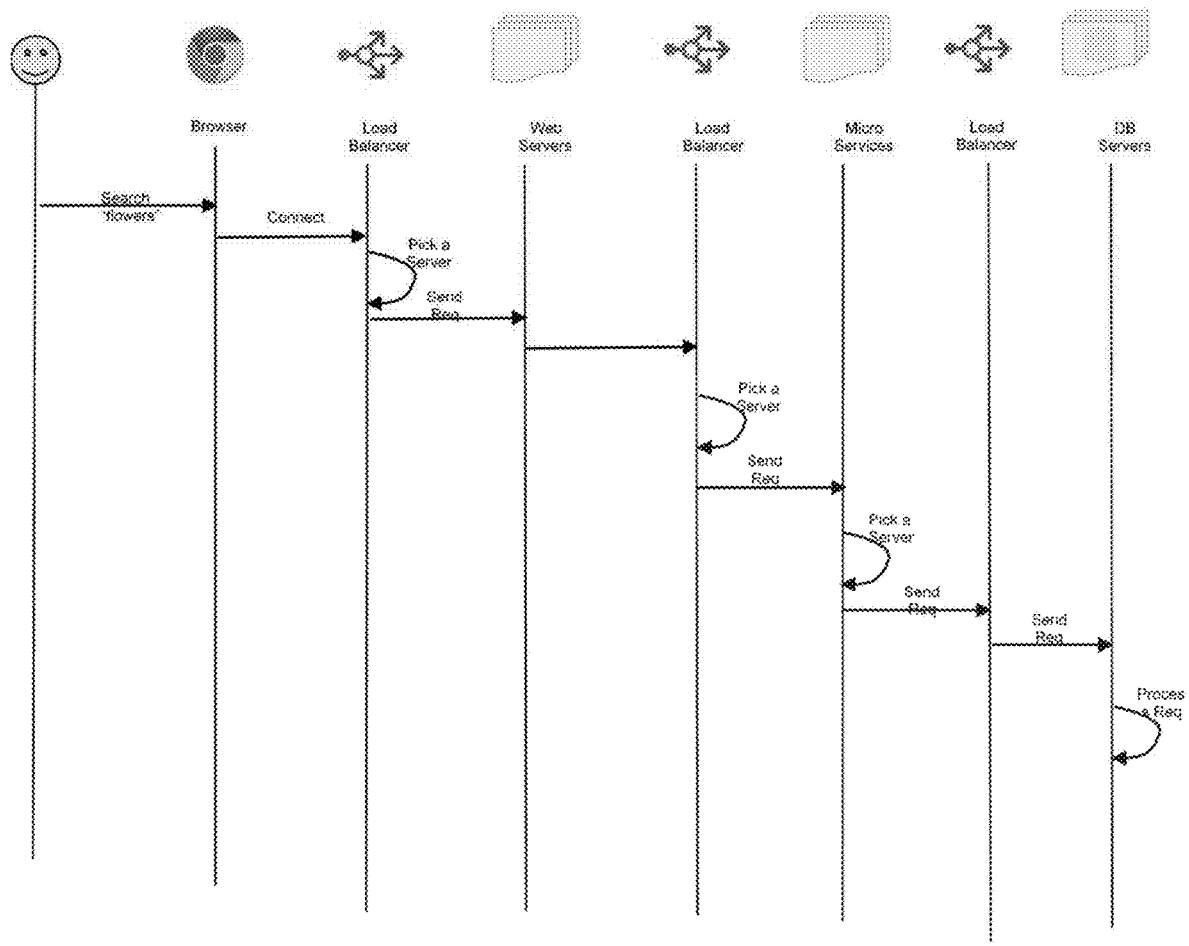
FIG. 11A illustrates an overview of how web browser requests are serviced over the internet in a current architecture.

FIG. 11A illustrates an overview of how web browser requests are serviced over the internet in a current architecture. A search for "flowers" is entered into a user's browser, which connects to a load balancer. The load balancer selects one or more servers and sends the search request on to those servers. There may be additional information required to fulfill the search request, and so one of the web servers may send a request to microservices and the microservices may in turn connect to one or more database servers, again through load balancers.

Figure 11B:
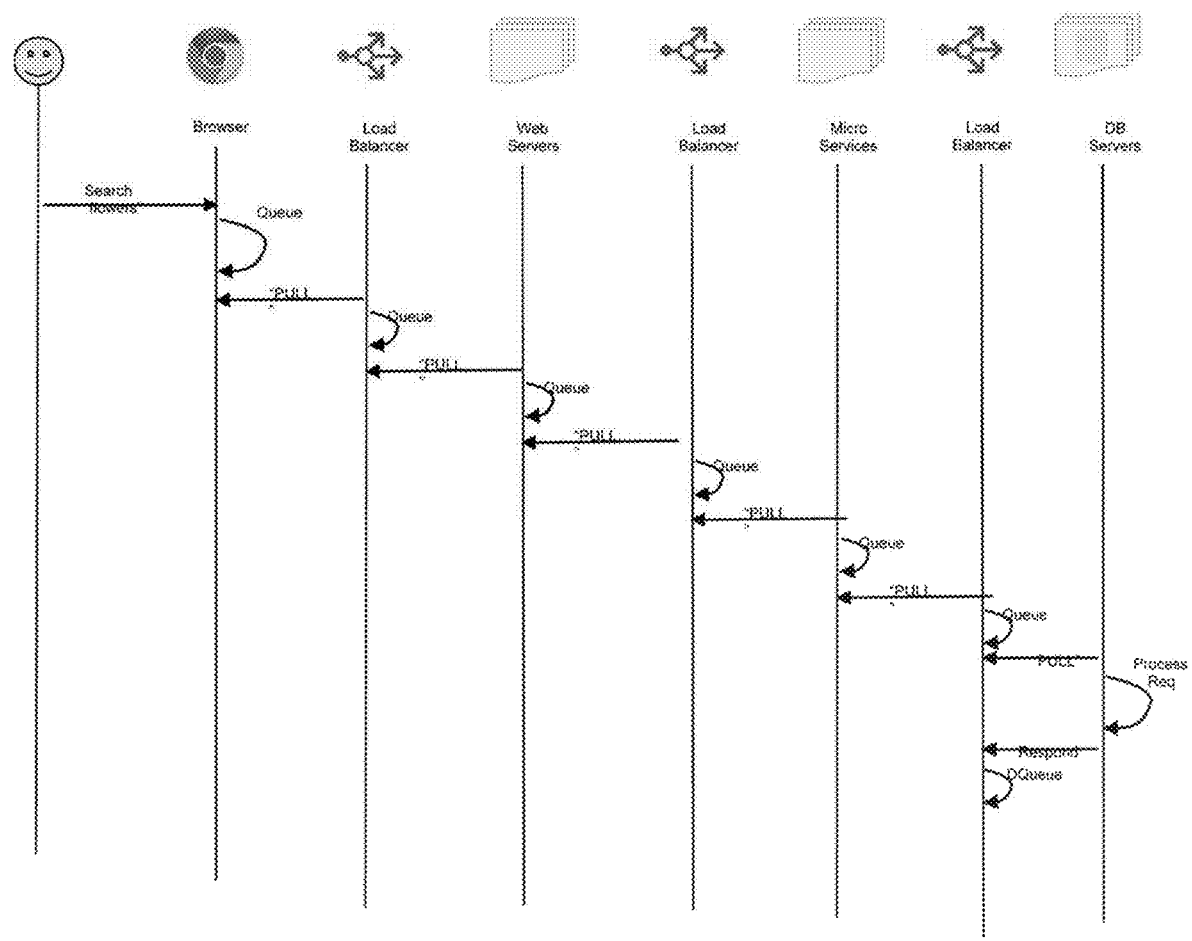
FIG. 11B illustrates an overview of how web browser requests may be serviced in a cooperative communication model in accordance with embodiments of the invention.

FIG. 11B illustrates an overview of how web browser requests may be serviced in a cooperative communication model in accordance with embodiments of the invention. A browser on a user's device registers with a load balancer or directly with a web server to inform its capacity by a process such as those initialization processes discussed further above. A search for "flowers" is entered into the browser, which is queued in the browser on the user's device instead of being served in real-time. An upstream load balancer pulls the search from the browser and queues it. It selects one or more web servers, which in turn pulls and queues the search request. The communications similarly are passed on to microservices and one or more database servers that finally process the request and send the response back downstream.

Database Client and Server

Figure 12:
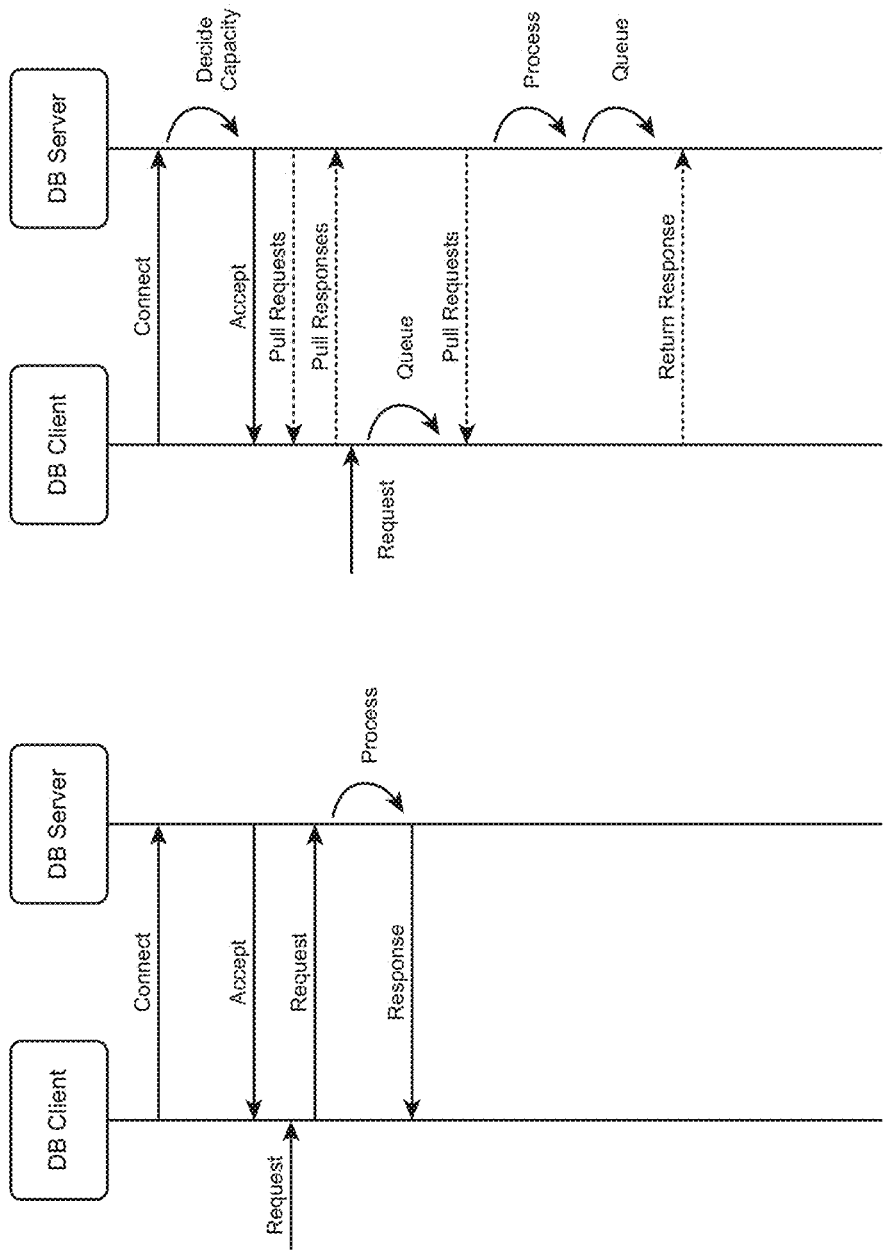
FIG. 12 conceptually illustrates a database client-server communication process utilizing a pull mechanism in accordance with certain embodiments of the invention.

In several embodiments of the invention, a cooperative communication model can be implemented in a database client and server system. FIG. 12 illustrates a traditional database client and server interaction on the left, and the interaction with a cooperative communication model in accordance with embodiments of the invention on the right. As can be seen in the figure, with a pull mechanism the client attempts to connect to the server. The server decides if it has capacity to serve the connection. The server periodically pulls requests from the client. The client queues its requests until they are pulled from the server.

Virtual Machine Registration with Operating System

Figure 13:
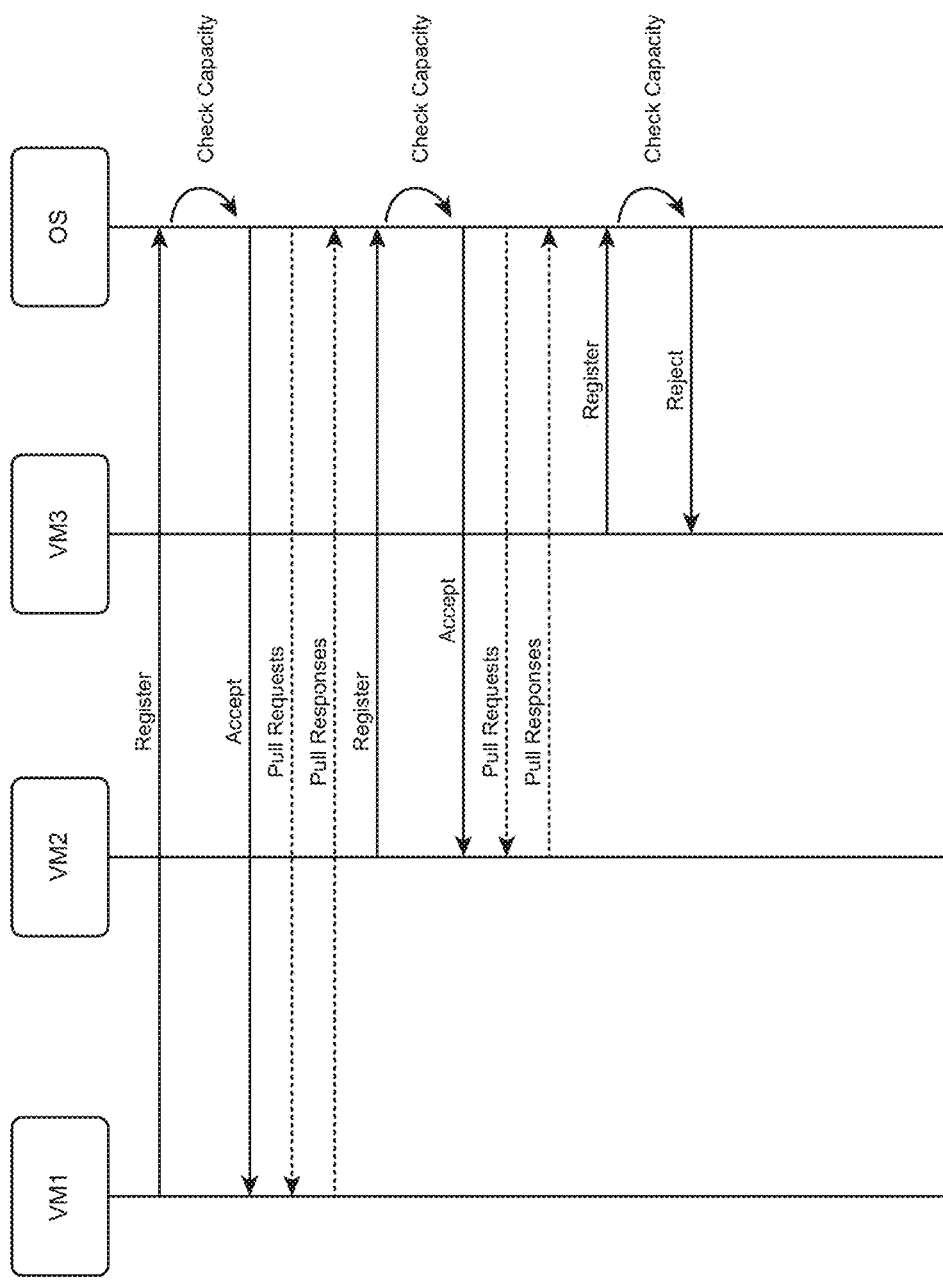
FIG. 13 illustrates a virtual machine spawning process utilizing a pull mechanism in accordance with certain embodiments of the invention.

In further embodiments of the invention, a pull mechanism can be implemented to regulate spawning of multiple virtual machines within an operating system on a particular computing platform. As shown in FIG. 13, virtual machines VM1 and VM2 are spawned and register with the operating system. Virtual machine VM3 requests registration with the operating system. At that point in time, there are not enough resources to support VM3 (e.g., limited memory, processing/CPU time, and/or storage, etc.). Based upon some criteria of available resources, the additional virtual machine (VM3) is then denied and VM3 is refused to spawn.

In different embodiments, the pull mechanism and overload conditions discussed above can be applied to instances of other requests on a computing platform, such as, but not limited to, processes, threads, docker containers, etc.

Single Process Server from HTTP to Hardware

Figure 14:
FIG. 14 illustrates a single process architecture utilizing a pull mechanism in accordance with certain embodiments of the invention.

In additional embodiments of the invention, a pull model can be utilized to implement single process architecture as shown by example in FIG. 14. In this model, the highest level protocol, such as internet protocol, (e.g., HTTP) passes information to lower levels including hardware with the respective protocols (e.g., NVMe, Ethernet) with no other intermediate processes in between.

Offensive Security Protection

Many existing security protection layers are based on proactive or reactive mechanisms, e.g., firewalls and threat detection platforms. The pull mechanism described above may be used to design a security paradigm that is offensive in nature. For example, a critical piece of enterprise system infrastructure that requires registration before a client is permitted to connect may be exposed on the public internet, without the proverbial firewall. When a client registration is attempted and fails, this can be recorded and repeat offenders can be detected (e.g., by machine learning algorithms). The detection data can be published to a set of entities (e.g., within a company or within an industry). Furthermore, a centralized authority can take steps to block or attack the offending client.

Storage Enhancements

Figure 15:
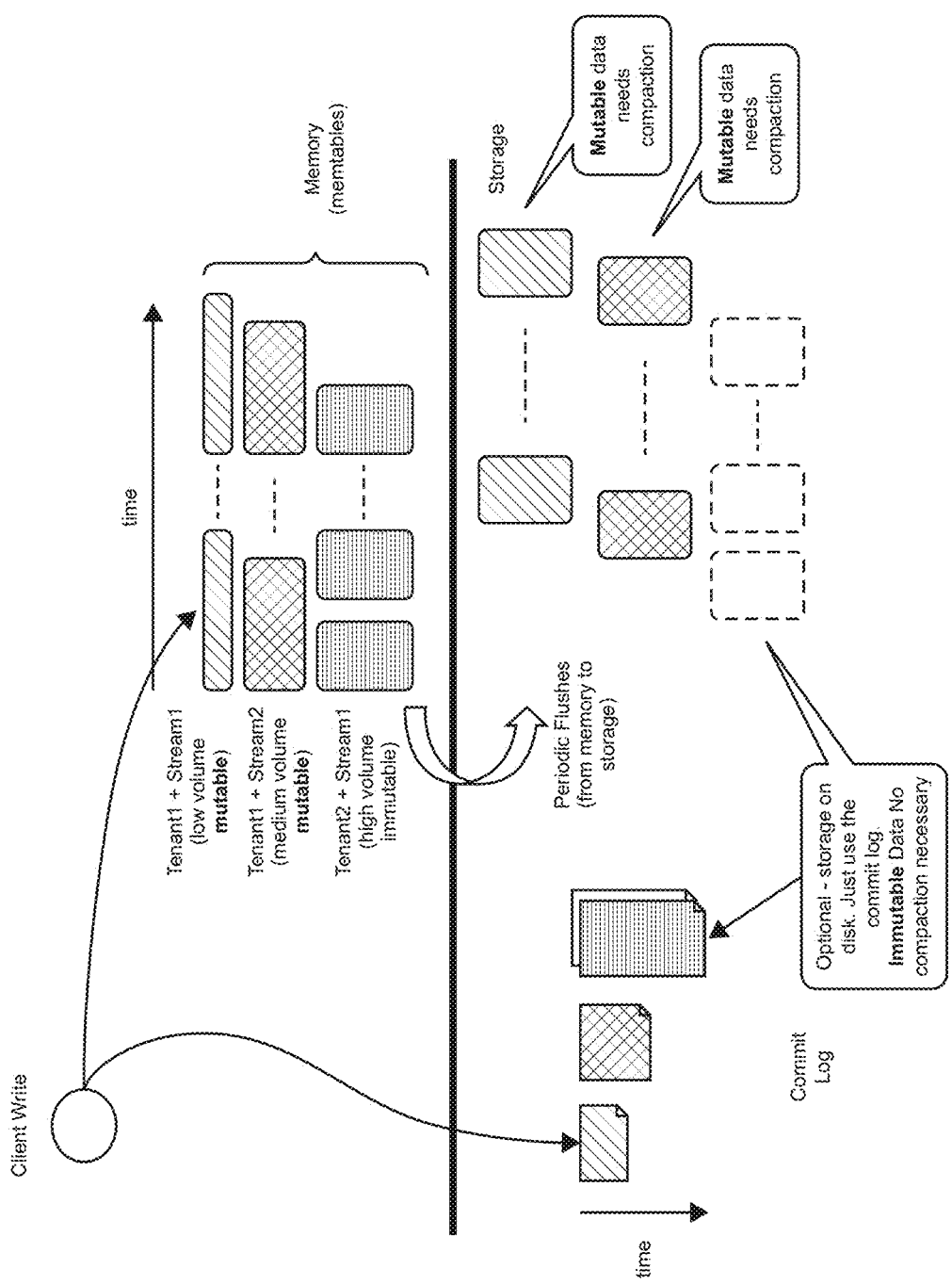
FIG. 15 conceptually illustrates movement of mutable and immutable type data through memory and performing compaction in accordance with certain embodiments of the invention.

Many database servers utilize a pluggable storage engine architecture that provides a standard set of management and support services that are common among all underlying storage engines. The storage engines themselves are the components of the database server that actually perform actions on the underlying data that is maintained at the physical server level. In many embodiments of the invention, data within a storage engine can be characterized as signal or context type of data and updated differently as will be described further below with reference to FIG. 15.

In many NoSQL (e.g., Bigtable, Cassandra, Hadoop) database systems, writes are written to memtables (in memory representations) and persisted to a commit log (acting as a write-ahead log) in a durable manner. Periodically memtables are flushed from memory to persistent storage to free up memory. These periodically flushed immutable snapshots of in-memory representations are called SStables (Sorted-String Tables). Given this architecture, a process of compaction is deployed which periodically merges copies of data (written to the same field at different times) within different SStables into a single one and writes into a new SStable. For example, when a field in a record is updated, the system writes a new record that specifies what the latest value is. When a user of the system tries to retrieve the field value within that record, the system has to read all previous writes to determine which are the most recent values that were written. Compaction typically refers to processes that bound the number of previous writes that need to be consolidated by a read.

In many embodiments of the invention, commit logs and memtables can be separated for each tenant and stream combination (e.g., tenant 1 with stream 1, tenant 1 with stream 2, tenant 2 with stream 1, etc.). Different types of data streams can be treated differently with respect to whether to perform compaction.

As discussed further above, two types of data streams can include signal and context. Signal type data streams are typically high volume and immutable (e.g., data is not modified after creation and/or past data remains relevant/meaningful and do not need to be stored as separate data files on disk. In some embodiments of the invention, the commit log can be used as the data file, which reduces the number of writes and can help with tiering (e.g., can be moved to second tier storage quickly). The data source client can send the commit log to the data processing engine rather than incremental data. In several embodiments, a spool as described further above, can be utilized as a client side portion of a commit log. When data source clients send data to a server, the spools from the clients can be combined to create a commit log on the server side.

Context data can be flushed from memory to persistent storage to create constant sized data files at a rate based upon the incoming data date. For example, if a first stream includes 1000 operations per second and a second stream includes 100 operations per second, data in memory from the first stream can be flushed every second while data in memory from the second stream can be flushed every ten seconds to keep the data files consistent between the two streams. This can allow for optimal system utilization (e.g., flushes, layout on disk, etc.).

In several embodiments of the invention, storage use can be optimized by recognizing and determining whether data being written to a database is signal type or context type. The criteria for such recognition in various embodiments can be set by a user or learned from the data. The recognition of signal vs. context data can contribute to enabling a pluggable storage engine architecture, as well as client side optimizations such as awareness of schema of the database. Next is described client side optimizations before returning to additional server side enhancements.

Client Side Optimizations

Client-Side Driver (Data Source)

As mentioned further above, data source clients (e.g., IoT devices/sensors, user devices, PoS devices, and/or servers) may be configured with a corresponding data collection application that can be executed to direct a data source client, in particular its processor(s), to collect data in accordance with embodiments of the invention. The data collection application in certain embodiments can include one or more components that are provided by a third-party vendor, e.g., as part of an SDK.

In many existing cloud-native data platforms, data sources are normally unaware of the schema of the database. They typically send raw data (i.e., unprocessed or undigested) that may be structured, unstructured, or semi-structured to a data processing engine.

In many embodiments of the invention, a data source client is schema-aware. Accordingly, at least some digestion tasks (e.g., indexing, aggregation, etc.) can be performed by a data source client on at least some of the incoming source data. In some such embodiments, the data source may send non-digested information to the data processing engine in an opaque manner, such as in binary large object (BLOB) representation. Digested or partially digested information can include, for example, indexes, aggregations, data sketches, filtering, etc., and may exclude the raw source data, which can be sent separately (e.g., in a BLOB). Processes for digestion with a schema-aware client are discussed below.

Processes for Schema-Aware Client to Digest Input Data

Figure 16:
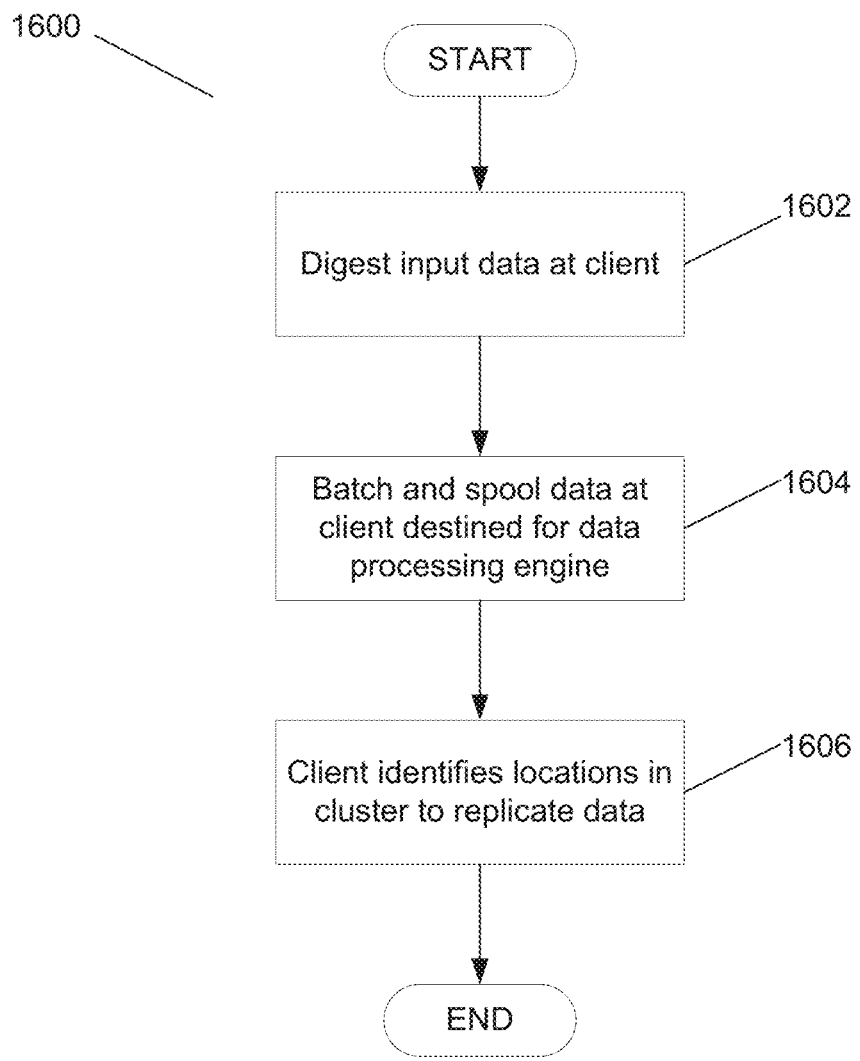
FIG. 16 illustrates a process for a data source client to digest input data in accordance with certain embodiments of the invention.

As discussed further above, some data source clients may be schema-aware and perform some digestion on their input data before sending it to a data processing engine in accordance with embodiments of the invention. One such process in accordance with some embodiments of the invention is illustrated in FIG. 16.

The process 1600 includes a data source client collecting input data. Input data can include, for example, one or more events (e.g., an HTTP click event having five fields). The data source client performs at least some digestion tasks (1602) (e.g., indexing, aggregation, etc.) on the input data to create a digest. The data source client may extract fields from the one or more events by having information about the schema (i.e., being schema-aware). The data source client batches (1604) multiple digests to send to a data processing engine. A collection of digests may be sent as a BLOB or as individual digests. In the event of communication failure, it can also spool the digested data until the data processing engine is available. In some embodiments, it also sends the raw input data (which can be packed into a BLOB), while in other embodiments it does not.

As will be discussed below, conventional database systems typically utilize a coordinator that determines where (to which replica) data from a client should be written. In several embodiments of the invention, the data source client is aware of the locations of replicas of the destination database within servers of a cluster and therefore does not need to use a coordinator. The data source client can identify (1606) the replica locations where the data (digested or raw) is meant to be written and send the data to be written to those replicas directly rather than a coordinator as an intermediary.

Although a specific process is discussed above with respect to FIG. 16, one skilled in the art will recognize that any of a variety of processes may be utilized in accordance with embodiments of the invention.

Replica-Aware Data Source Client

For fault tolerance by redundancy, a database used by a data processing engine is often replicated (copied) across multiple machines. A coordinator, or master database, receives data to write from a data source client and writes to each replica (copy) of the destination database. In certain embodiments of the invention, a data source client is aware of the locations of the replica databases. Thus, it can write directly to the replicas and bypass the coordinator. Most distributed databases would avoid doing so as it is very difficult to manage the exact set of replicas to write to in the presence of failures within the cluster or cluster rebalancing. Certain embodiments of the invention propose to make this management, determining the right quorum(s) of replicas at any given time, simple enough for client libraries to handle it. Furthermore, when there is a failure to write to any particular replica, the data source client may utilize a spool feature such as that discussed further above or other mechanism to compensate for availability, such as a hinted handoff by another replica.

Figure 17:
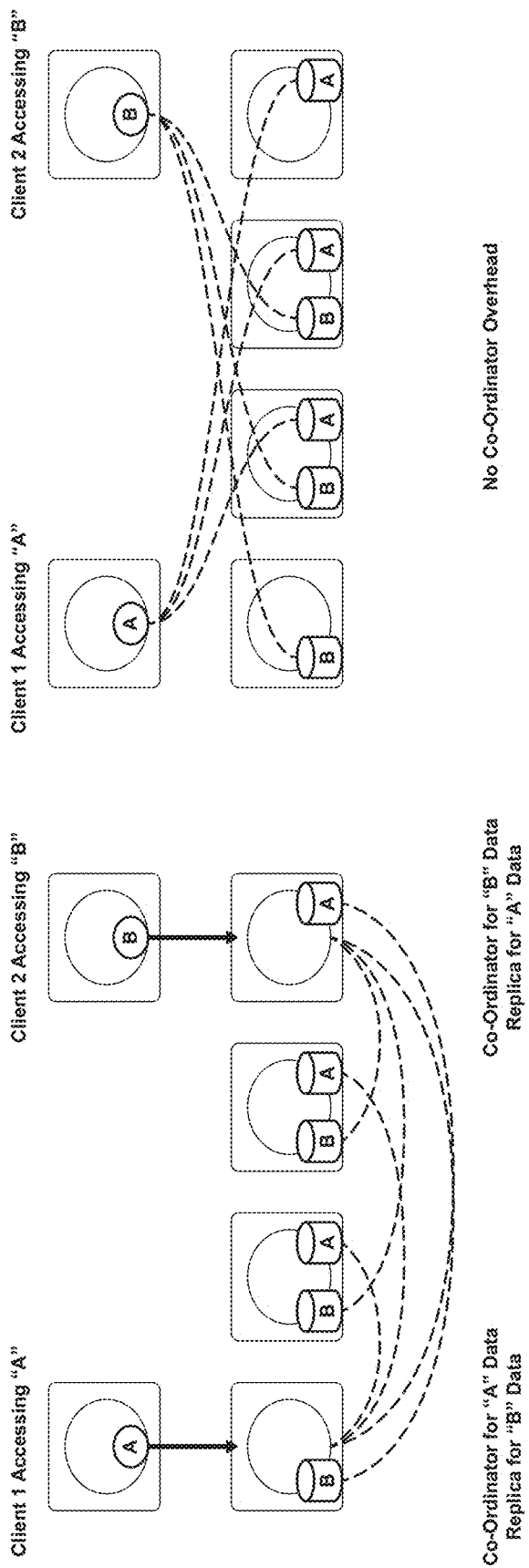
FIG. 17 conceptually illustrates an access pattern of clients to database replicas in accordance with certain embodiments of the invention.

An example showing a comparison of the two scenarios is illustrated in FIG. 17. Where a coordinator is involved, client 1 sends a write request for blue data to the blue data coordinator, which in turn writes the blue data to the three replicas of blue data. Client 2 sends a write request for red data to the red data coordinator, which in turn writes the red data to the three replicas of red data. Where a coordinator is not involved, in accordance with certain embodiments of the invention, client 1 writes blue data directly to the three replicas of blue data. Client 2 writes red data directly to the three replicas of red data.

Service level agreements (SLA) set an expectation for uptime and performance. In several embodiments of the invention, the data source client can determine ideal query latencies from different replicas using any of a variety of techniques, such as, but not limited to, using machine learning, heuristics, configuration, etc. If the response is not returned within a certain threshold of time (e.g., within 90th percentile or 500 ms), the query can be preemptively sent to another replica based upon any of a variety of factors, such as, but not limited to, network distance, server load, capacity, etc. This can allow the data source client to maintain SLA guarantees.

As discussed further above, a cooperative communication model can be utilized in accordance with embodiments of the invention. For example, replicas can "pull" write requests from data source clients where they are queued. If a data source client is attempting to send a write request to a first replica and the replica does not pull the request within a certain threshold of time, the data source client can change the destination of the queued write request to a second replica.

Distributed scale-out data platforms typically store multiple copies of data across multiple instances/machines which are placed across racks within a datacenter and even across datacenters. This requires writing and reading to be done at a quorum level of consistency. For example, in a database system with three copies of data, two of the replicas have to guarantee writes and reads succeed. This requires 3× network/IO traffic for reads and writes for 100% of the time. In embodiments of the invention utilizing a replica-aware client, reads can be done from a single replica most of the time. This can cut the read IO (on the network and storage) by at-least half (assuming reads have to be sent to at least 2 copies). The choice of which replica to use can be done by the client based upon its knowledge about which has the "freshest" data. Even after such a selection, it is possible that the client's determination is not accurate, for example, due to changes in distributed state and race conditions. When this happens, the replica chosen can inform the client that it does not have the latest state and only in that case the client retries from another replica, which is now expected to be further ahead. Also, the client can inform the three replicas to arrive at a consistent state, usually referred to by a process called as repair. This can be configured to happen either during the transaction (the client is blocked), right after the transaction (the client is unblocked, and right after the client performs, at some time in the near future. (e.g., 500 ms after the transaction), or after a set threshold is reached (e.g., 10 pieces of data need repair or 500 ms has passed, whichever comes earlier).

By combining multiple optimizations as discussed above across the server, for example a unique storage engine where the commit-log is used as a data file for signals as described further above, replica-aware client, and leaderless consensus protocol (arriving at consensus of N copies of data without a specific leader), the process of repairing (fixing inconsistent data copies) can be made deterministic (avoiding unpredictable SLAs) and efficient by multiple orders of magnitude (e.g., reading ~0.01% of the data as opposed to ~50% the data) as compared to other distributed databases.

Many embodiments of the invention provide the data source client with a translation layer. The translation layer can perform tasks such as, but not limited to, caching, interpolation, inference, derived metrics, prefetching, etc.

Spooling and Batching for Reliable Data Transfer

The communication between a data source client and data processing engine can be severed due to various reasons (e.g., network failures, data processing cluster being down or slow, etc.). To accommodate such outages, many traditional data processing systems usually introduce an intermediary element to manage reliable communications (e.g., Kafka), which incurs additional costs and resources. Such systems "buffer" data while the destination is not available to receive data.

In many embodiments of the invention, data that is to be sent from a data source client to the data processing engine can be spooled on the data source client. Data destined for the data processing engine can be stored in memory on the data source client designated as a "spool" and held when the data communication with the processing engine fails. The spool can be in volatile (e.g., RAM) or non-volatile memory (e.g., storage media such as solid state or disk drives). The data source client can pull events from the spool and send them to the data processing engine in the order they originally arrived. Using a spool on the client side eliminates the need for a centralized buffer and inherently contributes to scalability. Since clients are often microservices, they have elastic scale-out with their capacity and own spools, where a spool can grow or shrink with the client.

In some additional embodiments of the invention, rather than a "client push" configuration where a client initiates or determines the timing of data transfers, data transfer occurs in what can be referred to as a "cooperative communication" model. In this configuration, data can be held in a spool and not sent from a data source client to a data processing engine until the data processing engine requests it. The data processing engine can be configured to pull requests periodically or based upon some criteria, e.g., when resources are available to handle incoming data. In some such embodiments, the client-side spool may always be used to hold data to be sent, rather than only in the case of failure. This can enable an end-to-end deterministic system, particularly on cloud services where traditionally they are inherently not deterministic because of how shared usage by multiple customers is structured.

Traditional data processing systems typically transfer data from data sources to a data processing engine in real-time (e.g., as events are generated). In several embodiments of the invention, events are batched together in memory and sent as a batch load rather than in real-time. This trades off expected latency for better determinism. System utilization of the overall end to end (E2E) system can thereby be improved (e.g., memory allocation, network utilization, I/O efficiency, etc.). Next are described additional enhancements on the server side in accordance with embodiments of the invention.

Additional Server Enhancements

Handling Late Events

In a data processing system, data from a data source client to a data processing engine can arrive late for a variety of reasons—the data source client spools data (e.g., when a receiving cluster is down), the network link is degraded (e.g., mobile devices on cellular networks, IoT devices, etc.), and/or batch ingestion of data at rest at regular intervals. A traditional solution to accommodate data latency and tolerance is lambda architecture, which utilizes both batch and real-time stream processing. It typically operates by ingesting and processing time stamped events that are appended to existing events rather than overwriting them.

In several embodiments of the invention, late events can be handled in a unified manner without relying on a traditional lambda architecture as follows. A data source client generates the event timestamp for its events, which is modified by the data processing engine to be unique to that client by adding a number of bits to it (e.g., top three most significant bits). When the data processing engine receives a new event, it compares the timestamp of the event to a configurable time watermark. If the event is late compared to the time watermark, the data processing engine makes a note to trigger a recomputation of digested metrics, for some historical duration. The recomputation can then be done upon any of a variety of conditions, including, but not limited to, when needed (e.g., the metrics are requested), greedily, or when a threshold of pending number of recomputations is reached.

Data Sketches

Data Sketches are numerical metrics computed over a variety of attributes of digested data, e.g. sum(orderAmount), countDistinct(customerId), etc. Rather than plain calculations, data sketches created in accordance with embodiments of the invention can provide more rich information by incorporating additional context in the form of underlying categories for the data types of attributes. The categories can be assigned by a user or can be determined dynamically by inferring from the data. The type of calculation that would provide meaningful information may be different per category.

For some numeric attributes, they can be defined as additive or gauge categories. Numeric attributes with additive categories (e.g., orderValue) are those that can be aggregated, and can therefore be computed via SUMs and displayed for business intelligence using bar charts. Numeric attributes with gauge categories (e.g., age) represent some non-additive value, from which the system can calculate median or standard deviation, or use illustration on a line chart.

String attributes can be defined as dimension or description categories (e.g., address). Dimension categories have values that can be duplicated (e.g., country), for which can be computed distinct count, distribution of count, or unique occurrences. Description categories have values that are substantially unique, and can be sampled.

Enrichments

Figure 18:
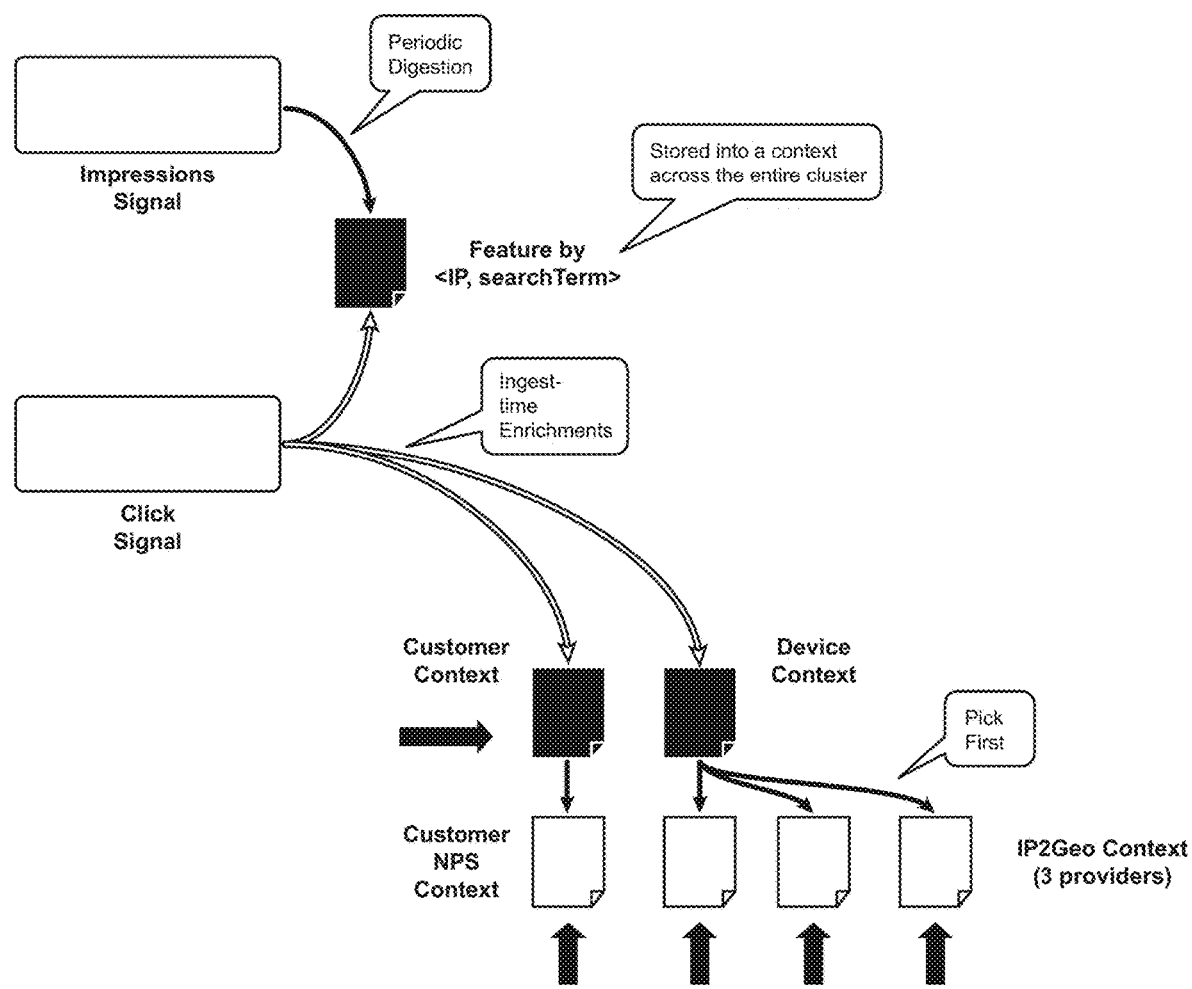
FIG. 18 conceptually illustrates a process for signal and context joins in accordance with certain embodiments of the invention.

Enrichments produced by a data processing system can include signal to signal, context to context, and signal to context enrichments. To join two tables, the data types of keys on which the two tables are being joined need to be the same. An example of a signal to signal join is computing click-through rates by joining searches executed to clicks. The join can be used to detect click fraud, e.g., when a click on an advertisement (ad) has no matching search that served the ad it is probably due to a bot. Such joins are usually performed as computationally expensive brute force searches (e.g., through IP addresses) and therefore only practical for large organizations with extensive computing resources. Several embodiments of the invention include techniques for performing joins in a computationally efficient manner while accepting some tolerance for delays, for example, by enriching data that is late by a threshold amount of time (e.g., few hundred milliseconds). The concepts according to an embodiment are discussed below with reference to FIG. 18.

The process takes data values of two signals that are to be digested, SIG1 and SIG2, which usually occur one after another and can be related to each other by some key. The key can be two or more shared attributes of data values that are common between the two signals. For example, SIG1 can represent impressions (e.g., an ad is served within search results after a web search is performed), and SIG2 can represent clicks (the link of a served ad is clicked through or followed in a web browser). A click is typically understood to occur after an impression. The shared key may be a composite of <IPAddress, SearchTerm>.

Next, a feature is defined on SIG1 with the shared key (e.g., <IPAddress, SearchTerm>), which is autoloaded as a context within the data processing system periodically as it is computed (e.g., every 30 seconds). For example, the context can be a simple hashmap as data is coming in from SIG1 using the shared key (e.g. searches from a matching IP address). Any of a variety of refresh policies can be applied, such as overwrite, merge, most-recently only with sliding and tumbling windows.

The periodic autoloading of the context can be performed in an atomic manner across a set of servers during the digestion phase, optimizing for the avoidance of cache pollution, etc. Techniques can be utilized for communicating state updates to distributed computing systems, such those described in U.S. Pat. Pub. No. 2020/0159714 entitled "Distributed data storage and analytics system" to Rawal et al. (the '714 publication), the relevant portions of which are incorporated by reference in their entirety.

SIG2 events are enriched (joined) with the context during ingestion in real-time, before they are written to storage.

In additional embodiments of the invention, a signal can be joined with itself. For example, every impression can be appended with the average number of impressions based on some dimension (e.g., IP address).

In further embodiments of the invention, a signal to signal join can be used to perform efficient sliding window computation. The sliding average computed across N historical time intervals can be determined without having to look at all N intervals. because the memory of prior intervals is encoded in the next interval. For example, the sliding window can be a rolling average of the most recent 30 seconds of clicks.

Several embodiments of the invention provide one of two declarative and efficient ways to achieve multi-joins as context to context enrichment. First, when information about a particular entity (e.g., a customer) is stored in two different contexts. A signal can be enriched with a context C1 (e.g., Customer Context) and append an attribute A1 (e.g., NPSScore), which is stored in context C2 (e.g., CustomerNPS Context).

Second, where information about a particular entity needs to be fetched from multiple sources. For example, if there are three sources of IP2Geo mappings (lookup of geographic location from IP address) and it is not known a priori which mapping contains the IP address that the click within the click signal came from. The click signal can be enriched with an IP2Geo mapping context, which can look up each of the three underlying mappings and return a value based upon a policy. The policy can be, for example, matching the first one found, looking up all three, or performing an average (e.g., for NPS score), etc.

Attribute Similarity/Anomaly Recommender

Data analytics for a typical customer can include modeling some tens of streams, each having some tens of attributes. Often it can be difficult to know that a set of attributes (columns in a table) across different streams are the same (i.e., have the same type of information) because they may have different names (e.g., "product ID" and "PID").

Several embodiments of the invention include techniques to derive similarity (or distinctiveness) across various attributes and provide a recommendation to a user accordingly. For example, a "Find Similar Attributes" feature could be invoked in the system, which finds set overlaps across the data for different attributes even though they may be named differently. Data for attributes can be compared for the appearance of identical values indicating that the attributes are similar.

For another example, when a signal to context join is being defined on a common attribute, the system could probe the metrics (from the data) to provide a warning that there is no similarity between the two attributes the enrichment is attempted upon.

Feature Recommender and Archiver

Aspects of additional embodiments of the invention can provide a feature recommendation engine and/or archiver that predictively identifies features that would be useful (recommended) or not useful (archived) for machine learning. Some embodiments may utilize data sketches and attribute similarity as discussed above. Feature identification can be performed dynamically so that a feature that was valuable at one point may be archived if it is not valuable later, and similarly recommended if it becomes valuable when it was not before. Furthermore, if a feature that was previously archived is then accessed by a user application, it can be automatically recomputed without a specific user request.

Features of data can be individual attributes of events (e.g., which country did this order come from) or aggregates (what is the average value of orders for this product SKU). Significant time spent in feature engineering involves looking at a variety of such features and figuring out which have predictive power. Systems and methods in accordance with several embodiments can dynamically recommend which features may be interesting as data is updated. There can be two levels of assistance.

First, certain attributes may not be as important or useful when there is low diversity of values. For example, assume an attribute/column of ENABLED can only be TRUE or FALSE. A DISTINCTCOUNT of TRUE (or of FALSE) is not very interesting for the purpose of machine learning as it cuts the population in half. In contrast, consider an attribute of ORDERAMOUNT (representing the total cost of an order), which would have a high distribution of DISTINCTCOUNT as well as averages. Ranking the importance of attributes based on their probable distribution of values can be done in a simple way by recognizing the name of an attribute (column), (as opposed to looking at the data values) and thereby the likely type of data can be inferred. Another mechanism can be to attach informational tags that can provide this context or categories that are provided by a user or learned from analyzing data.

Additional embodiments of the invention can evaluate different attributes that represent the same type of information but may be populated differently. For example, consider attributes of "First Name" (containing a customer first name), "Last Name" (containing a customer last name), and "Name" (containing a customer first name and last name separated by a space), but "First Name" and "Last Name" are not always populated (e.g., sending empty strings) while "Name" is more often populated. With an understanding of data patterns (for example, using data sketches), if a user has not defined a feature on a column that is more meaningful, like "Name", it can be recommended to a user based on the data. Whereas "First Name" and "Last Name" that are less populated are recommended not to be used.

Furthermore, consider two streams—searches and clicks. Search includes a field named productId and click includes a field named PID. While the fields are named differently, they both are semantically the same. Therefore, it makes sense for clicks to be joined with searches on the key PID (which would map to productId in searches). Since the system knows the format of the data, it can recommend the "join" key. Contrariwise, consider when fields in both streams are named productId, but the data was disjoint. If the user tried to perform a "join" on productId between the two streams, the system could warn that there is nothing in common between the two fields.

Finally, selecting an attribute can trigger finding "similar" attributes across multiple streams (tenant or system wide) irrespective of their names. By looking at the data sketches, the system can surface a ranked list of similar attributes within the tenant or system. The contrary can also be done—finding the most dissimilar attributes within a tenant or system compared to a particular attribute. Similarity of attributes can be analyzed as discussed further above, e.g., by comparing their names and/or data types within a column.

Exactly-Once Semantics

Detecting duplicates is valuable for maintaining clean data for analytics. Several embodiments of the invention enable detection in read-time so that data is not double counted and without a centralized lock.

Audit Logging on Context

Several embodiments of the invention provide a model whereby genuine updates to records/rows within a Context are recorded into an Audit Signal. This will require a read-before-write and it is typically expensive. But by using techniques as described in U.S. Pat. Pub. No. 2020/0159714 entitled "Distributed data storage and analytics system" to Rawal et al. (the '714 publication), the relevant portions of which are incorporated by reference in their entirety, these reads can be done on a single replica within a cluster. The system can perform a "diff" of data to be updated with the record already there. Updates can be done using the following rules:
  a) If no record exists, the a record will be inserted (i.e., a write will be done)
  b) If a record exists and the new data to be updated is different than one that exists, the existing record will be update (i.e., a write will be done)
  c) Optionally, a user may define a col. within the record to represent the timestamp of the event. If the new record to be updated has a timestamp lesser than that already present, the update will be discarded or written to a special "discardedUpdates" signal. This would help with deduplication via events that are late-arriving and/or due to retries.

In all cases when records/rows within a Context are genuinely updated, the exact operation(CREATE, UPDATE), the value before and after is also written into an audit signal. This can help in two areas:
  Analytics applications usually rely upon only the last state record/row within a Context. This can be achieved in two ways. If the user has selected deduplication based upon timestamp, then every read within the Context will already return the last state. If that option wasn't enabled by the user the analytics application can read the "auditSignal" to only process changes and look for operations to the same record/row within a Context (usually identified via a primary-key), and only look at the latest operation performed. Envision a last ( ) operator that can be provided by the data processing engine to do so efficiently.
  Processing by analytics application can be sped up by 20-25× in real world scenarios via these optimizations.

Deduplication in a Distributed System

For a variety of reasons, data in a distributed system may be unintentionally duplicated, e.g., retries in case of failures, time-outs, etc. Many systems solve this by introducing locks or a centralized leader. A data processing engine in accordance with certain embodiments of the invention can implement any of a number of unique architectural advantages that can reduce the probability of duplicates significantly. For example, per optimizations discussed here multiple components can be collapsed into a single hyper-converged platform. Furthermore, a cooperative communication protocol such as discussed further above reduces the probability of retries significantly.

There may still be a small possibility of duplicates, for example, due to unreliable networks, upgrades, etc. Two additional mechanisms may be utilized in accordance with embodiments of the invention. First, in some embodiments, every write is appended with a unique identifier, referred to as an uniquifier, that is guaranteed to be globally unique (e.g., using a combination of counters). Retries for inserting an event will always use the same primary key (Event time+uniquifier) regardless of which server is used as the coordinator. This ensures that a single event if written multiple times (due to retries) is read again, will always return the latest one. Alternatively, the uniquifier can also be a hash of the event contents if the application wants deduplication of events based upon contents of the event. This can be useful to detect "late-arriving" events.

While using an uniquifier can help rereading raw duplicate events, it may not help with correcting already digested data (e.g., the same event may be double counted). To address this, a trigger capability can be implemented to detect the write of a duplicate event (via in-memory lookup) and trigger re-processing of the digested information. This implies that the digests can be considered to be free of duplicates in an eventually consistent manner.

Since this involves reading for an already written event, two optimizations may be employed. First, the data processing engine may provide configurability in the duration within which the digests can be reprocessed (in the case of duplicates). This configuration can be aligned with how often data is flushed from memtables to persistent storage, so that the lookup can be aligned with only in-memory lookups. Second, the raw data write can be performed, and the client can be unblocked before checking for duplicate events. This way, the client is not blocked for the duplication check (which is the case in conventional "read-before-write" systems).

Checkpointing in a Distributed System

When bulk writes are done (e.g., pulled from a repository such as S3, RDBMS, or Files), and then written as a batch to a data processing engine within a data platform, there is a need to checkpoint and start from where the write left off in the event that the application performing the write fails in-transit. These problems are especially hard in situations where multiple instances of a client are writing to multiple servers within a cluster. When the application restarts there is a need to know a "globally consistent" way about which was the last successful write.

In several embodiments of the invention, checkpoints can be provided by allowing every instance of the SDK to provide reference numbers, which can be named as previousTracker, currentTracker and applicationId along with every write. The data processing engine can keep track of all durable ranges of tracker values and return a list of durable ranges to the application. This list of durable ranges can be maintained in memory and checkpointed to storage for fast recovery. The data processing engine can allow an application to retrieve the above tracker information in a globally consistent manner. PreviousTracker and currentTracker are integers that increase monotonically with each write, although there could be gaps. Most of the time currentTracker=previousTracker+1, but failures on the application end can result in gaps where the difference is more than 1. This approach to tracking durability can result in an efficiency three times or more than in existing systems.

Although the description above contains many specificities, these should not be construed as limiting the scope of the invention but as merely providing illustrations of some of the presently preferred embodiments of the invention. Various other embodiments are possible within its scope. Accordingly, the scope of the invention should be determined not by the embodiments illustrated, but by the appended claims and their equivalents.

What is claimed is:

1. A method for preparing and sending data from a data source client device to a data processing engine, the method comprising:
   providing a database schema and a cluster configuration of a data processing engine to a data source client, where:
      the database schema includes information about structure, organization, and relationships within the data processing engine; and
      the cluster configuration includes metadata identifying of locations where data is stored as replica copies within the data processing engine;
   collecting raw input data on the data source client device;
   digesting at least a portion of the raw input data on the data source client device according to the database schema to generate digested input data;
   identifying, by the data source client, a plurality of replica locations within the data processing engine to store replicated copies of the digested input data and transferring the digested input data from the data source client to the identified replica locations for storage.

2. The method of claim 1, where transferring the digested input data from the data source client to the identified replica locations for storage comprises:
   collecting, by the data source client device, digested input data in memory until it is requested by the data processing engine;
   determining, by the data processing engine, that it has capacity for receiving data;
   requesting, by the data processing engine, digested input data from the data source client when it determines that it has capacity for receiving data;
   receiving, from the data source client device, digested input data by the replica locations within the data processing engine.

3. The method of claim 1, wherein the data processing engine comprises at least a first processor core and a second processor core within a group of processor cores, and the method further comprises:
   receiving raw input data and a first portion of digested input data from the data source client through an input/output bus at a first processor core within a group of processor cores on a server, where the digested input data is digested by the data source client;
   providing the received raw input data and first portion of digested input data from the first processor core to a second processor core within the group of processor cores;
   digesting the received raw input data by the second processor core to create a second portion of digested input data;
   providing the second portion of digested input data from the second processor core to the first processor core; and
   writing, by the first processor core, the first portion of digested input data and the second portion of digested input data to the storage.

4. The method of claim 3, where only the first processor core of the group of processor cores is permitted to communicate with the input/output bus on the server.

5. The method of claim 1, further comprising sending at least a portion of the raw input data from the data source client to the identified replica locations for storage.

6. The method of claim 5, wherein the raw input data is in a different format than the digested input data.

7. The method of claim 1, further comprising:
   when the data processing engine is not available, collecting digested input data in a memory.

8. The method of claim 7, wherein the memory is volatile memory.

9. The method of claim 7, wherein the memory is non-volatile memory.

10. The method of claim 1, wherein sending the digested input data from the data source client to the identified replica locations for storage further comprises:
    collecting, by the data source client, a plurality of elements of raw input data and a plurality of elements of digested input data in memory; and
    receiving, from the data source client, the plurality of elements of raw input data by the identified replica locations when a predetermined number of elements is collected.

11. The method of claim 1, further comprising:
    receiving a query request from the data source client by a first of the identified replica locations;
    when a response to the data source client has not been returned within a predetermined time window, identifying a second of the plurality of replica locations to send the query request to; and
    receiving the query request from the data source client by the second identified replica location.

12. The method of claim 1, further comprising:
    generating, by the client, an event message and an event timestamp and sending both to the data processing engine;

receiving, by the data processing engine, the event message and event timestamp;

adding, by the data processing engine, a unique identifier to the event timestamp that identifies the client;

comparing, by the data processing engine, the event timestamp to a time watermark;

recomputing, by the data processing engine, previously digested metrics when the event timestamp is later than the time watermark.

13. The method of claim 1, wherein transferring the digested input data from the data source client to the identified replica locations for storage further comprises:

assigning a currentTracker integer reference number representing the count of the write, a previous Tracker integer reference number representing the currentTracker of the previous write, and an applicationId reference number representing the application that is requesting the write;

incrementing the currentTracker of the next write, carrying over the currentTracker of the previous write as the previous Tracker of the next write;

comparing the currentTracker and previous Tracker of the next write.

14. The method of claim 1, further comprising:

identifying, by the data source client, a first target replica location of the plurality of replica locations that has the highest tracker value, where the data source client has a tracker value associated with each of the plurality of replica locations;

receiving, from the data source client, a read request by the first target replica location;

determining, by the first target replica location, whether it accurately has the highest tracker value;

receiving, from the first target replica location, one or more data values responsive to the read request by the data source client when the first target replica location accurately has the highest tracker value.

15. The method of claim 14, further comprising:

receiving, from the first target replica location, a response that it does not have the highest tracker value when the first target replica location does not accurately have the highest tracker value;

receiving, from the data source client, a second read request at a second target replica location different from the first target replica location when the target replica location does not accurately have the highest tracker value.

16. The method of claim 15, further comprising:

reconciling the first target replica location when the target replica location does not accurately have the highest tracker value.

17. The method of claim 14, further comprising:

reconciling the first target replica location and sending the latest data value to the data source client when the target replica location does not accurately have the highest tracker value.

18. The method of claim 1, wherein transferring the digested input data from the data source client to the identified replica locations for storage further comprises:

for each write operation, generating a uniquifier number that is globally unique;

when a write operation is retried after an initial request, assigning the same primary key to the retried write operation, where the primary key includes the uniquifier and event time;

triggering recomputation of previously digested metrics when a duplicate is detected within a predetermined period of time.

19. The method of claim 1, further comprising:

transferring the raw input from the data source client to the identified replica locations for storage by:

for each write operation, generating a uniquifier number that is globally unique;

when a write operation is retried after an initial request, assigning the same primary key to the retried write operation, where the primary key includes the uniquifier and event time;

triggering recomputation of previously digested metrics when a duplicate is detected within a predetermined period of time.

20. The method of claim 1, further comprising:

storing the transferred digested input data at a replica location by:

inserting a record when no record for the input data is present at the replica location; and saving a log of the insertion of the record;

updating an existing record when a record for the input data is present at the replica location; and saving a log of the updating of the existing record that includes both previous and new data values.

* * * * *